United States Patent
Nimbalker et al.

(10) Patent No.: US 12,317,350 B2
(45) Date of Patent: May 27, 2025

(54) SIGNALING ENHANCEMENT FOR DYNAMIC POWER SHARING IN DUAL CONNECTIVITY

(71) Applicant: Telefonaktiebolaget LM Ericsson (publ), Stockholm (SE)

(72) Inventors: Ajit Nimbalker, Fremont, CA (US); Ravikiran Nory, San José, CA (US); Stefan Wager, Espoo (FI); Antonino Orsino, Kirkkonummi (FI); Havish Koorapaty, Saratoga, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 292 days.

(21) Appl. No.: 17/908,813

(22) PCT Filed: Mar. 24, 2021

(86) PCT No.: PCT/SE2021/050253
§ 371 (c)(1),
(2) Date: Sep. 1, 2022

(87) PCT Pub. No.: WO2021/206605
PCT Pub. Date: Oct. 14, 2021

(65) Prior Publication Data
US 2023/0109624 A1    Apr. 6, 2023

Related U.S. Application Data

(60) Provisional application No. 63/006,494, filed on Apr. 7, 2020.

(51) Int. Cl.
*H04W 76/15* (2018.01)
*H04W 72/1268* (2023.01)

(52) U.S. Cl.
CPC ....... *H04W 76/15* (2018.02); *H04W 72/1268* (2013.01)

(58) Field of Classification Search
CPC . H04W 28/18; H04W 72/1268; H04W 76/15; H04W 92/20
See application file for complete search history.

(56) References Cited

U.S. PATENT DOCUMENTS

| | | | |
|---|---|---|---|
| 2019/0141520 A1 | 5/2019 | Li et al. | |
| 2020/0100223 A1 | 3/2020 | Park et al. | |

FOREIGN PATENT DOCUMENTS

| | | | | |
|---|---|---|---|---|
| CN | 107222891 A | * | 9/2017 | ............ H04W 28/08 |
| CN | 107852714 A | * | 3/2018 | ........... H04L 5/0053 |

(Continued)

OTHER PUBLICATIONS

"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.

(Continued)

*Primary Examiner* — Zhensheng Zhang
(74) *Attorney, Agent, or Firm* — Murphy, Bilak & Homiller, PLLC

(57) ABSTRACT

Embodiments include methods for a master node (MN) configured to provide a master cell group (MCG) in dual connectivity (DC) with a user equipment (UE) together with a secondary node (SN) configured to provide a secondary cell group (SCG). Such methods include determining one or more restriction parameters to control selection of the UE's SCG configuration by the SN, such that the UE's minimum required processing time, T_SCG, of SN messages scheduling UE uplink (UL) SCG transmissions is smaller than a maximum value derived from the one or more restriction parameters. Such methods include sending, to the SN, at (Continued)

least portion of the determined restriction parameters. Other embodiments include complementary methods for an SN, as well as network nodes configured to perform such methods.

18 Claims, 14 Drawing Sheets

(56) References Cited

FOREIGN PATENT DOCUMENTS

| EP | 3244675 A1 | 11/2017 |
|---|---|---|
| KR | 20150109970 A | 10/2015 |
| WO | 2015065076 A1 | 5/2015 |
| WO | 2019122518 A1 | 6/2019 |
| WO | WO-2019242447 A1 * | 12/2019 |

OTHER PUBLICATIONS

"3GPP TS 33.401 V16.2.0", 3rd Generation Partnership Project; Technical Specification Group Services and System Aspects; 3GPP System Architecture Evolution (SAE); Security architecture (Release 16), Mar. 2020, pp. 1-167.

"3GPP TS 38.213 V17.0.0", 3rd Generation Partnership Project; Technical Specification Group Radio Access Network; NR; Physical layer procedures for control (Release 17), Dec. 2021, pp. 1-225.

"Discussion on Toffset for NR-DC power control", 3GPP TSG-RAN WG2 #109bis-e, R2-2003198, Electronic Meeting, Apr. 20-Apr. 30, 2020, pp. 1-22.

"3GPP TS 37.340 V15.8.0", 3rd Generation Partnership Project; Technical Specification Group Radio Access Network; Evolved Universal Terrestrial Radio Access (E-UTRA) and NR; Multi-connectivity; Stage 2 (Release 15), Dec. 2019, pp. 1-71.

"3GPP TS 38.213 V16.0.0", 3rd Generation Partnership Project; Technical Specification Group Radio Access Network; NR; Physical layer procedures for control (Release 16), Dec. 2019, pp. 1-146.

"3GPP TS 38.300 V16.1.0", 3rd Generation Partnership Project; Technical Specification Group Radio Access Network; NR; NR and NG-RAN Overall Description; Stage 2 (Release 16), Mar. 2020, pp. 1-133.

"3GPP TS 38.214 V15.5.0", 3rd Generation Partnership Project; Technical Specification Group Radio Access Network; NR; Physical layer procedures for data (Release 15), Mar. 2019, pp. 1-103.

"3GPP TS 38.331 V15.5.0", 3rd Generation Partnership Project; Technical Specification Group Radio Access Network; NR; Radio Resource Control (RRC) protocol specification (Release 15), Mar. 2019, pp. 1-491.

"3GPP TS 38.423 V15.0.0", 3rd Generation Partnership Project; Technical Specification Group Radio Access Network; NG-RAN; Xn application protocol (XnAP) (Release 15), Jun. 2018, pp. 1-195.

"3GPP TR 38.804 V1.0.0", 3rd Generation Partnership Project; Technical Specification Group Radio Access Network; Study on New Radio Access Technology; Radio Interface Protocol Aspects (Release 14), Mar. 2017, pp. 1-56.

"LS on uplink power control for NR-NR Dual-Connectivity", 3GPP TSG RAN WG2#109bis-e, R2-2002517, Online meeting, Apr. 20-30, 2020, pp. 1-2.

"LS on uplink power control for NR-NR Dual-Connectivity", 3GPP TSG-RAN WG1 Meeting #100, R1-2001421, e- Meeting, Feb. 24-Mar. 6, 2020, pp. 1-2.

"Missing fields for Toffset coordination in INM", 3GPP TSG-RAN WG2 Meeting #111-e, R2-2007578, Electronic Meeting, Aug. 17-28, 2020, pp. 1-28.

"Remaining issues on uplink power control for NR-DC", 3GPP TSG-RAN WG1 #100, R1-2000980, e-Meeting, Feb. 24-Mar. 6, 2020, pp. 1-7.

* cited by examiner

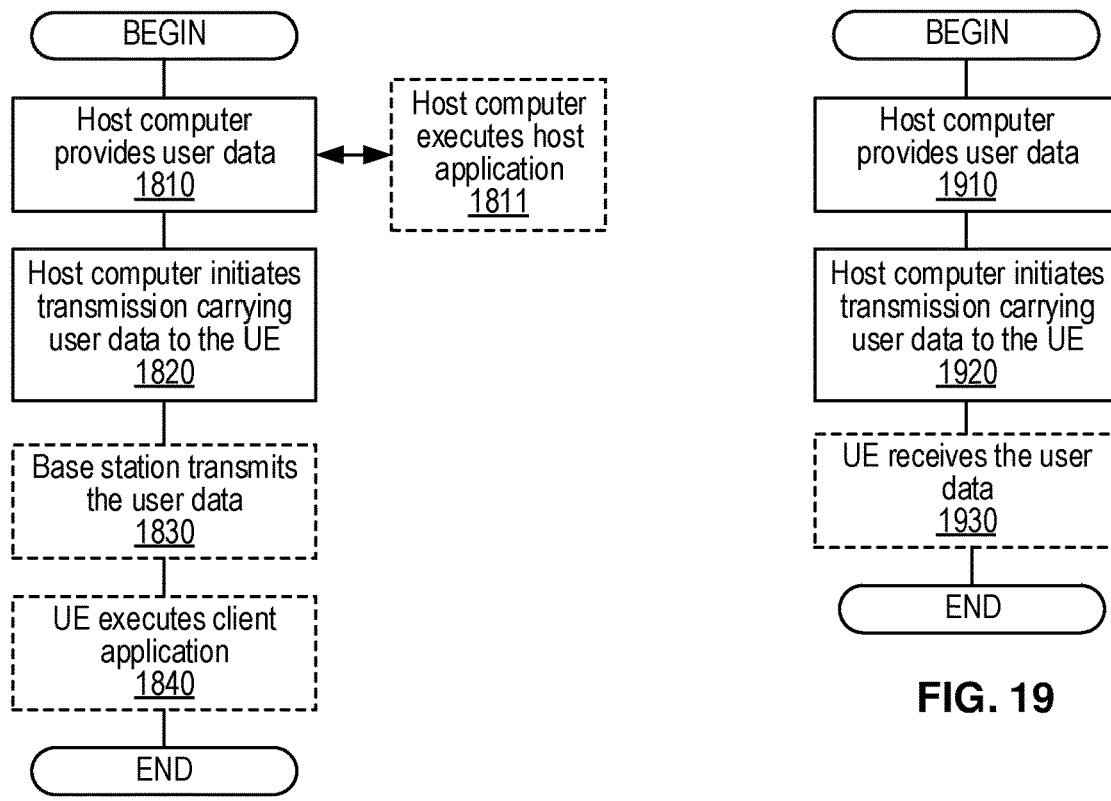
FIG. 18
FIG. 19
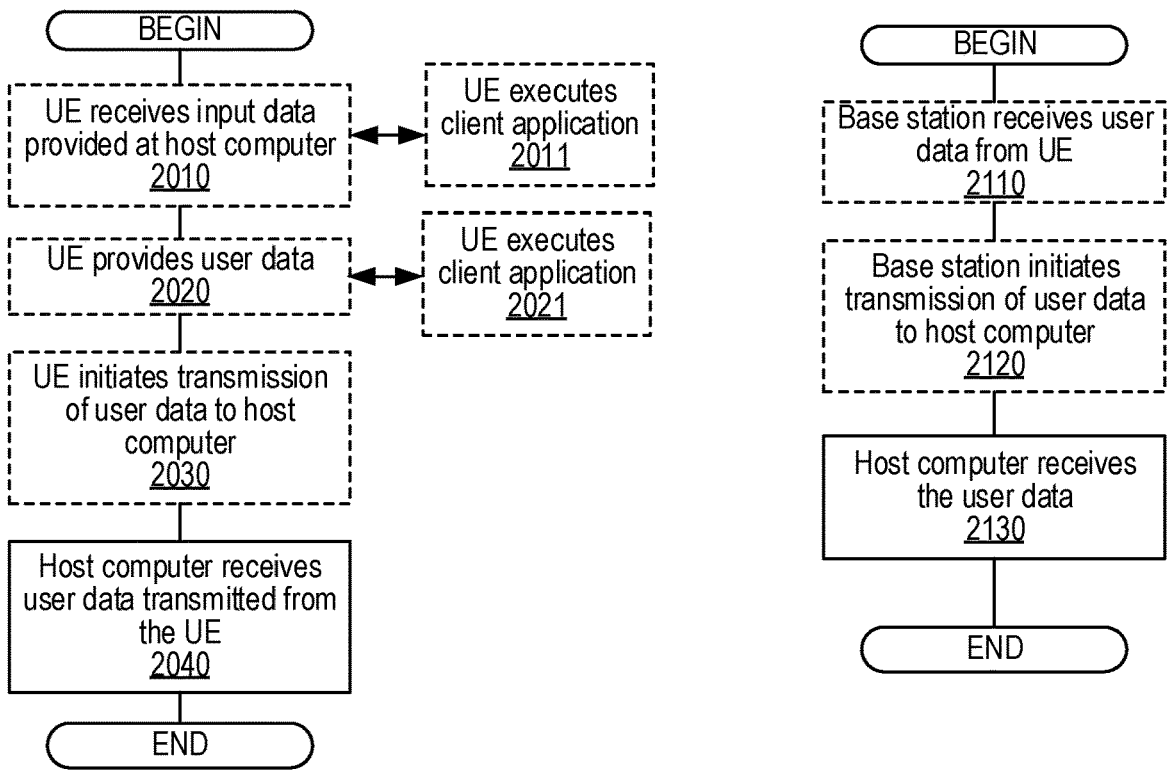
FIG. 20
FIG. 21

SIGNALING ENHANCEMENT FOR DYNAMIC POWER SHARING IN DUAL CONNECTIVITY

TECHNICAL FIELD

The present application relates generally to the field of wireless communications, and more specifically to apparatus, methods, and computer-readable media that improve operation of user equipment (UEs, e.g., wireless devices) configured in dual connectivity via multiple serving cells provided by different network nodes in a wireless network.

BACKGROUND

Currently the fifth generation ("5G") of cellular systems, also referred to as New Radio (NR), is being standardized within the Third-Generation Partnership Project (3GPP). NR is developed for maximum flexibility to support multiple and substantially different use cases. These include enhanced mobile broadband (eMBB), machine type communications (MTC), ultra-reliable low latency communications (URLLC), side-link device-to-device (D2D), and several other use cases. The present disclosure relates generally to NR, but the following description of Long Term Evolution (LTE) technology is provided for context since it shares many features with NR.

LTE is an umbrella term for fourth generation (4G) radio access technologies (RATs) developed within 3GPP and initially standardized in Releases 8 and 9, also known as Evolved UTRAN (E-UTRAN). LTE is available in various frequency bands and is accompanied by improvements to non-radio aspects referred to as System Architecture Evolution (SAE), including the Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink (UL) and downlink (DL), as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MIME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

FIG. 2 illustrates a block diagram of an exemplary control plane (CP) protocol stack between a UE, an eNB, and an MIME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer provides resources for transferring data over transport channels via the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MIME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

The multiple access scheme for the LTE PHY is based on Orthogonal Frequency Division Multiplexing (OFDM) with a cyclic prefix (CP) in the DL, and on Single-Carrier Frequency Division Multiple Access (SC-FDMA) with a cyclic prefix in the UL. To support transmission in paired and unpaired spectrum, the LTE PHY supports both Frequency Division Duplexing (FDD) and Time Division Duplexing (TDD). The FDD DL radio frame has a fixed duration of 10 ms and consists of 20 slots, labeled 0 through 19, each with a fixed duration of 0.5 ms. A 1-ms subframe includes two consecutive slots, each of which includes $N^{DL}_{symb}$ OFDM symbols comprised of $N_{sc}$ OFDM subcarriers.

In general, a physical channel corresponds to a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH).

PBCH carries the basic system information, required by the UE to access the network. PDSCH is the main physical channel used for unicast DL data transmission, but also for transmission of RAR (random access response), certain system information blocks, and paging information. PHICH carries HARQ feedback (e.g., ACK/NAK) for UL transmissions by the UEs. Similarly, PDCCH carries DL scheduling assignments (e.g., for PDSCH), UL resource grants (e.g., for PUSCH), channel quality feedback (e.g., CSI) for the UL channel, and other control information. The LTE PHY DL also includes various reference signals, synchronization signals, and discovery signals.

Uplink (UL, i.e., UE to eNB) physical channels provided by the LTE PHY include Physical Uplink Shared Channel (PUSCH), Physical Uplink Control Channel (PUCCH), and Physical Random Access Channel (PRACH). PUSCH is the uplink counterpart to the PDSCH. PUCCH is used by UEs to transmit uplink control information, including HARQ acknowledgements, channel state information reports, etc. PRACH is used for random access preamble transmission. In addition, the LTE PHY UL includes various reference signals, some of which are associated with UL channels (e.g., DM-RS with PUSCH).

A dual connectivity (DC) framework was introduced in LTE Rel-12. Dual connectivity refers to a mode of operation in which a UE, in RRC_CONNECTED state, consumes radio resources provided by at least two different network points connected to one another with a non-ideal backhaul. In LTE, these two network points may be referred to as a "Master eNB" (MeNB) and a "Secondary eNB" (SeNB). More generally, master node (MN), anchor node, and MeNB can be used interchangeably, and the terms secondary node (SN), booster node, and SeNB can be used interchangeably. DC can be viewed as a special case of carrier aggregation (CA), where the aggregated carriers (or cells) are provided by network nodes that are physically separated and not connected via a robust, high-capacity connection.

More specifically, in DC, the UE is configured with a Master Cell Group (MCG) and a Secondary Cell Group (SCG). A Cell Group (CG) is a group of serving cells associated with either the MeNB or the SeNB(s) and includes one MAC entity, a set of logical channels with associated RLC entities, a primary cell, and optionally one or more secondary cells. The Master Cell Group (MCG) is a group of serving cells associated with the MeNB and includes a primary cell (PCell) and optionally one or more secondary cells (SCells). A Secondary Cell Group (SCG) is a group of serving cells associated with the SeNB and includes a Primary SCell (PSCell) and optionally one or more SCells.

The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

The MeNB provides system information (SI) and terminates the control plane connection towards the UE and, as such, is the controlling node of the UE, including handovers to and from SeNBs. For example, the MeNB terminates the connection between the eNB and the Mobility Management Entity (MME) for the UE. An SeNB provides additional radio resources (e.g., bearers) for radio resource bearers include MCG bearers, SCG bearers, and split bearers that have resources from both MCG and SCG. The reconfiguration, addition and removal of SCells can be performed by RRC. When adding a new SCell, dedicated RRC signaling is used to send the UE all required SI of the SCell, such that UEs need not acquire SI directly from the SCell broadcast.

The network's RRC connection with the UE is handled only by the MeNB and, accordingly, SRBs (Signaling Radio Bearers) are always configured as MCG bearer type and only use radio resources of the MeNB. However, the MeNB can also configure the UE based on input from the SeNB and, in this manner, the SeNB can indirectly control the UE. In an LTE-DC configuration, the MeNB is connected to the SeNBs via the Xn interface, which is currently selected to be the same as the X2 interface between the two eNBs. Both MeNB and SeNB can terminate the user plane (UP) to the UE. The aggregated UP provided by both nodes can increase throughput for users with good channel conditions and enable reception and/or transmission at higher data rates than can be supported by a single node, even without a low-latency backhaul connection between the MeNB and SeNB.

Several DC (or more generally, multi-connectivity) scenarios have been considered for 5G/NR networks. These include NR-DC that is similar to LTE-DC discussed above, except that both the MN and SN (referred to as "gNBs") employ the NR interface to communicate with the UE. In addition, various multi-RAT DC (MR-DC) scenarios have been considered, whereby a compatible UE can be configured to utilize resources provided by two different nodes, one providing E-UTRA/LTE access and the other one providing NR access.

In DC, UL power control mechanisms are needed in DC scenarios to set appropriate power levels for UE UL transmissions in MCG and/or SCG and to avoid exceeding any applicable limits. In some scenarios, the MCG and the SCG may not be co-located, and their implementation may not allow for close coordination of schedulers for the two cell groups. In these scenarios, network scheduling decisions for UE UL transmissions may not be fully coordinated between MCG and SCG, such that the UE may need to use power sharing mechanisms to distribute the transmission power across the two cell groups.

Conventionally, a UE (e.g., configured with NR-DC) determines a time offset (Toffset) such that the UE expects the MCG to schedule an UL transmission starting at time T by a scheduling message no later than time T−Toffset. However, these conventional solutions are based on the UE having knowledge of both the MCG and SCG configurations to determine Toffset. In certain uncoordinated scenarios, however, neither the MCG nor the SCG has knowledge of the other's configuration, which can cause various issues, difficulties, and/or problems for supporting DC in NR networks.

SUMMARY

Accordingly, exemplary embodiments of the present disclosure address these and other problems, issues, and/or difficulties in relation to UEs configured in dual connectivity (DC) by enabling both MN and SN to be aware of various aspects of UE processing time requirements, thereby improving scheduling of MCG and/or SCG UE UL transmissions.

Some embodiments include methods (e.g., procedures) for an MN configured to provide an MCG in DC with a UE together with an SN configured to provide an SCG.

These exemplary methods can include determining one or more restriction parameters to control selection of the UE's SCG configuration by the SN, such that the UE's minimum required processing time, T_SCG, of SN messages scheduling UE uplink (UL) SCG transmissions is smaller than a maximum value derived from the one or more restriction parameters. These exemplary methods can also include sending, to the SN, at least a portion of the determined restriction parameters.

In some embodiments, the one or more restriction parameters sent to the SN can include the maximum value. In some of these embodiments, for UE UL SCG transmissions that occur over a plurality of slots, the maximum value is applicable in each particular slot of the plurality. In some of these embodiments, the maximum value is maxT_SCG, which controls selection of the UE's SCG configuration by the SN, such that the UE's minimum required processing time, T_SCG, of SN messages scheduling UL SCG transmissions according to the selected SCG configuration does not exceed maxT_SCG.

In some of these embodiments, these exemplary methods can also include selecting an MCG configuration for the UE such that the UE's minimum required processing time, T_MCG, of MN messages scheduling UL MCG transmissions according to the selected MCG configuration, does not exceed maxT_SCG sent to the SN. In some variants, selecting the MCG configuration can also be based on UE capabilities. In some variants, the restriction parameters sent to the SN also include T_MCG.

In some of these embodiments, these exemplary methods can also include sending, to the UE, a first scheduling message for a first UL MCG transmission. In such embodiments, a last symbol of the first scheduling message is not less than T_MCG and not more than the maximum value before the first symbol of the first UL MCG transmission. In some variants, these exemplary methods can also include receiving, from the SN, an indication of a maximum possible SCG transmission length, max-SCGtxlength; or sending, to the SN, an indication of a maximum allowed SCG transmission length, max-allowedSCGtxlength. In such embodiments, the first UL MCG transmission is scheduled based on max-SCGtxlength or max-allowedSCGtxlength, as the case may be.

In some embodiments where the maximum value is maxT_SCG, these exemplary methods can also include receiving, from the SN, one or more of the following:
  the UE's minimum required processing time, T_SCG, of SN messages scheduling UL SCG transmissions according to an SCG configuration selected by the SN; and
  a request for updated restriction parameters for SN selection of an SCG configuration for the UE;
Such embodiments also include determining one or more updated restriction parameters, including an updated maxT_SCG that is different than the previously determined maxT_SCG; and sending, to the SN, the updated restriction parameters including the updated maxT_SCG. In some of these embodiments, maxT_SCG is greater than T_MCG by a first duration and the updated maxT_SCG is either equal to T_MCG or greater than T_MCG by a second duration that is less than the first duration.

In some embodiments, the one or more restriction parameters can include a maximum allowed value, maxToffset, between the following: a last symbol of a scheduling message for a UE UL MCG transmission that overlaps with a UE UL SCG transmission, and a first symbol of the UE UL SCG transmission. In some variants, maxToffset is determined by max(T_MCG, maxT_SCG), where:
  T_MCG is the UE's minimum required processing time of MN scheduling messages for UE UL MCG transmissions based on an MCG configuration for the UE; and
  maxT_SCG is a maximum allowed value of the UE's minimum required processing time, T_SCG, of SN scheduling messages UE UL SCG transmissions based on an SCG configuration for the UE.

In some embodiments, the one or more restriction parameters can include an indication of the UE's capability of minimum offset between a first symbol of a UE UL SCG transmission and a last received symbol of an earlier scheduling message for a UE UL MCG transmission that overlaps with the UE UL SCG transmission occasion.

In some embodiments, these exemplary methods can also include receiving, from the SN, a request for restriction parameters for SN selection of an SCG configuration for the UE. The at least a portion of the determined restriction parameters is sent to the SN in response to the request.

Other embodiments include methods (e.g., procedures) for an SN configured to provide an SCG in DC with a UE together with an MN configured to provide an MCG.

These exemplary methods can include receiving, from the MN, one or more restriction parameters to control selection of the UE's SCG configuration by the SN, such that the UE's minimum required processing time, T_SCG, of SN messages scheduling UE uplink, UL, SCG transmissions is smaller than a maximum value derived from the one or more restriction parameters. These exemplary methods can also include performing one or more of the following operations based on the one or more parameters: determining an SCG configuration for the UE, and scheduling an UL SCG transmission for the UE.

In some embodiments, the one or more restriction parameters sent to the SN include the maximum value. In some of these embodiments, for UE UL SCG transmissions that occur over a plurality of slots, the maximum value is applicable in each particular slot of the plurality. In some of these embodiments, the maximum value is maxT_SCG, which controls selection of the UE's SCG configuration by the SN, such that the UE's minimum required processing time, T_SCG, of SN messages scheduling UL SCG transmissions according to the selected SCG configuration does not exceed maxT_SCG.

In some of these embodiments, determining an SCG configuration for the UE can include selecting an SCG configuration for the UE such that T_SCG of the selected SCG configuration does not exceed maxT_SCG indicated by the restriction parameters. In some embodiments, selecting the SCG configuration can also be based on UE capabilities. In some variants, the one or more restriction parameters can include an indication of the UE's capability of minimum offset between a first symbol of a UE UL SCG transmission and a last received symbol of an earlier scheduling message for a UE UL MCG transmission that overlaps with the UE UL SCG transmission.

In some of these embodiments, scheduling an UL SCG transmission for the UE can include sending, to the UE, a first scheduling message for a first UL SCG transmission. In such embodiments, a last symbol of the first scheduling message is not less than T_SCG and not more than maxT_SCG before the first symbol of the first UL SCG transmission. In some variants, these exemplary methods can also include sending, to the MN, an indication of a maximum possible SCG transmission length, max-SCGtxlength; or receiving, from the MN, an indication of a maximum allowed SCG transmission length, max-allowedSCGtxlength. In such embodiments, the first UL SCG transmission is scheduled based on max-SCGtxlength or max-allowedSCGtxlength, as the case may be.

In some embodiments, the restriction parameters also include the UE's minimum required processing time, T_MCG, of MN scheduling messages for UL MCG transmissions based on an MCG configuration for the UE. In such embodiments, T_SCG of the determined SCG configuration is greater than or equal to T_MCG.

In some embodiments where the maximum value is received from the MN, these exemplary methods can also include sending, to the MN, one or more of the following:
- the UE's minimum required processing time, T_SCG, of SN messages scheduling UL SCG transmissions according to an SCG configuration selected by the SN; and
- a request for updated restriction parameters.

Such embodiments also include receiving, from the MN, the updated restriction parameters including an updated maximum value; and selecting a different SCG configuration that corresponds to an updated T_SCG that is less than or equal to the updated maximum value.

In some embodiments, the one or more restriction parameters can include a maximum allowed value, maxToffset, between the following: a last symbol of a scheduling message for a UE UL MCG transmission that overlaps with a UE UL SCG transmission, and a first symbol of the UE UL SCG transmission. In some variants, maxToffset is determined by max(T_MCG, maxT_SCG), where:
- T_MCG is the UE's minimum required processing time of MN scheduling messages for UE UL MCG transmissions based on an MCG configuration for the UE; and
- maxT_SCG is a maximum allowed value of the UE's minimum required processing time, T_SCG, of SN scheduling messages UE UL SCG transmissions based on an SCG configuration for the UE.

In some embodiments, these exemplary method can also include sending, to the MN, a request for restriction parameters for SN selection of an SCG configuration for the UE. The restriction parameters can be received from the MN in response to the request.

Other embodiments include network nodes (e.g., base stations, eNBs, gNBs, ng-eNBs, etc. or components thereof) configured to perform operations corresponding to any of the exemplary methods described herein. Other embodiments include non-transitory, computer-readable media storing computer-executable instructions that, when executed by processing circuitry, configure a network node to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIGS. 18-21 are flow diagrams of exemplary methods (e.g., procedures) for transmission and/or reception of user data that can be implemented, according to various exemplary embodiments of the present disclosure.

DETAILED DESCRIPTION

Figure 1:
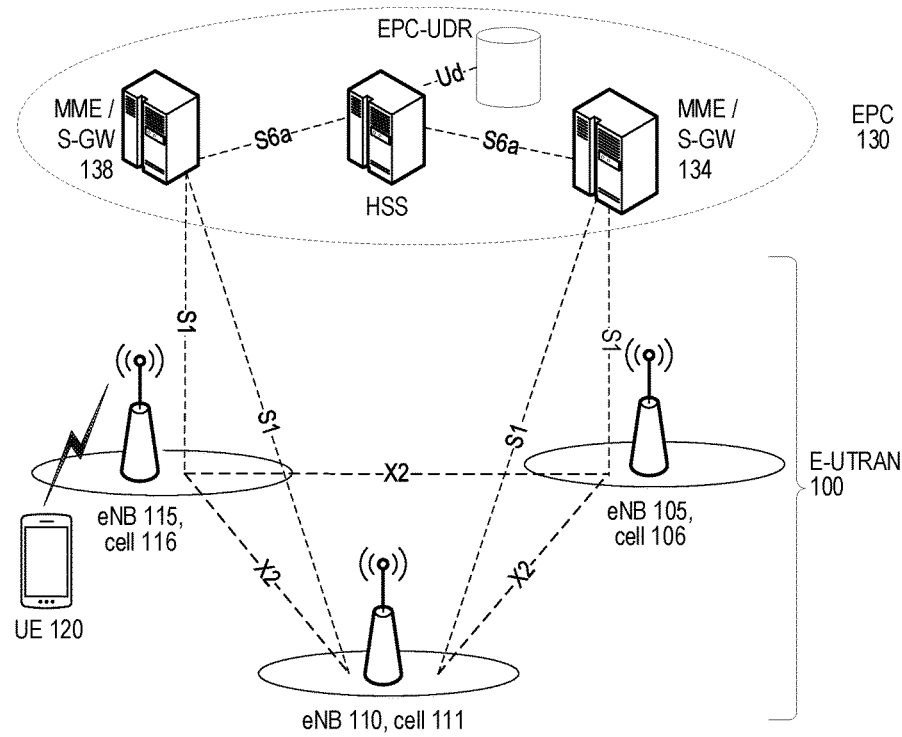
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2:
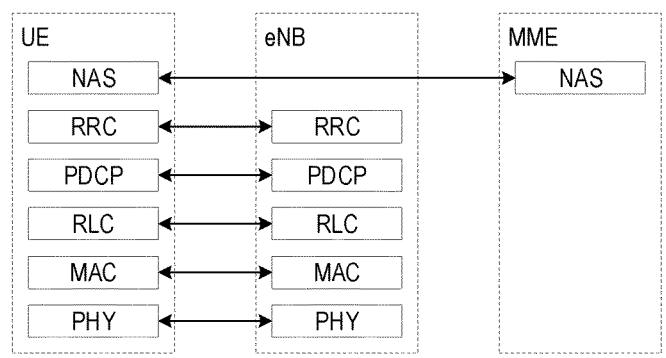
FIG. 2 is a block diagram of exemplary protocol layers of the control-plane portion of the radio (Uu) interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are given by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

Figure 3:
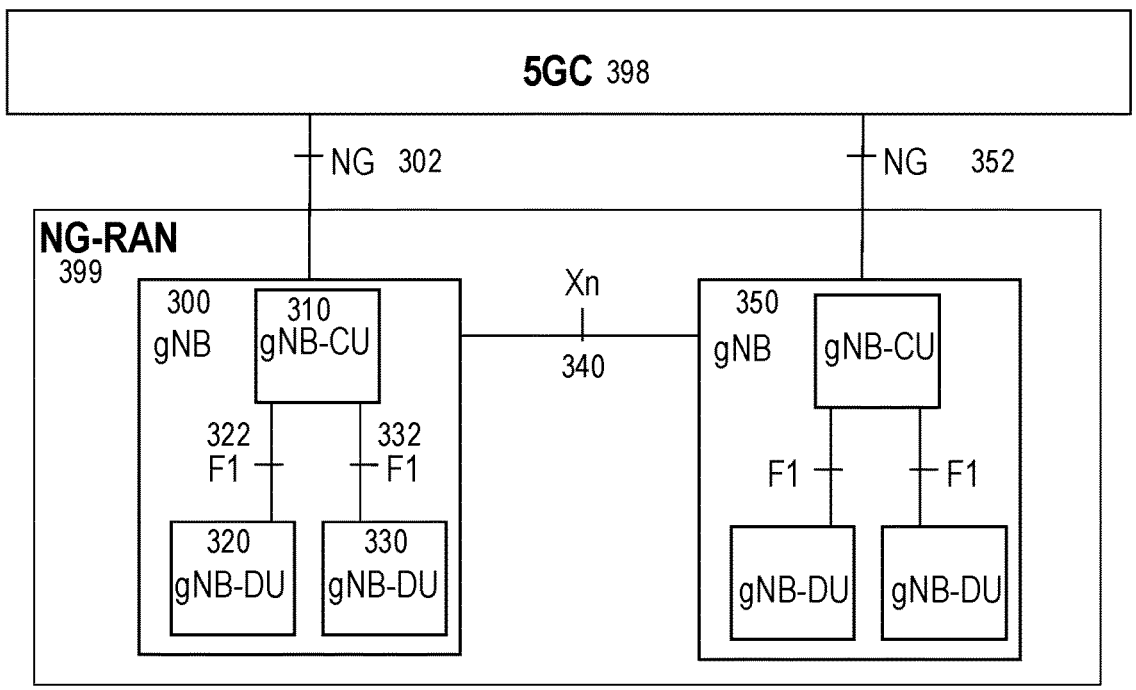
FIGS. 3-4 illustrate two high-level views of an exemplary 5G New Radio (NR) network architecture.

FIG. 3 illustrates a high-level view of an exemplary 5G network architecture, consisting of a Next Generation RAN (NG-RAN 399) and a 5G Core (5GC 398). NG-RAN 399 can include a set of gNodeB's (gNBs) connected to the 5GC via one or more NG interfaces, whereas the gNBs can be connected to each other via one or more Xn interfaces, such as Xn interface 340 between gNBs 300 and 350 in FIG. 3. With respect the NR interface to UEs, each of the gNBs can support frequency division duplexing (FDD), time division duplexing (TDD), or a combination thereof.

NG-RAN 399 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for control plane (CP) and user plane (UP) data on TNL of NG-RAN interfaces is supported, NDS/IP (3GPP TS 33.401) shall be applied.

The NG RAN logical nodes shown in FIG. 3 include a central (or centralized) unit (CU or gNB-CU) and one or more distributed (or decentralized) units (DU or gNB-DU). For example, gNB 300 in FIG. 3 includes gNB-CU 310 and gNB-DUs 320 and 330. CUs (e.g., gNB-CU 310) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to its associated gNB-DUs over respective F1 logical interfaces, such as interfaces 322 and 332 shown in FIG. 3. The gNB-CU and connected gNB-DUs are only visible to other gNBs and the 5GC as a gNB, e.g., the F1 interface is not visible beyond gNB-CU. In the gNB split CU-DU architecture illustrated by FIG. 3, DC can be achieved by allowing a UE to connect to multiple DUs served by the same CU or by allowing a UE to connect to multiple DUs served by different CUs.

Figure 4:
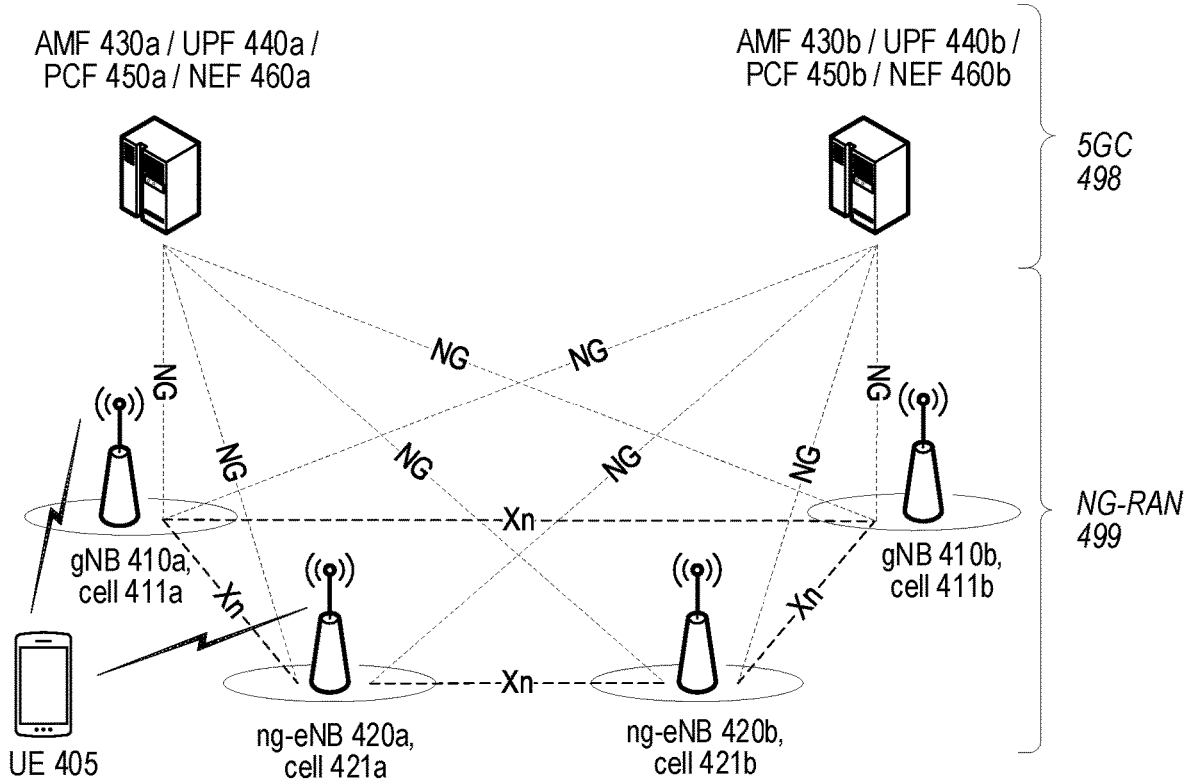

FIG. 4 shows another high-level view of an exemplary 5G network architecture, including a Next Generation Radio Access Network (NG-RAN) 499 and a 5G Core (5GC) 498. As shown in the figure, NG-RAN 499 can include gNBs 410 (e.g., 410a,b) and ng-eNBs 420 (e.g., 420a,b) that are interconnected with each other via respective Xn interfaces. The gNBs and ng-eNBs are also connected via the NG interfaces to 5GC 498, more specifically to the AMF (Access and Mobility Management Function) 430 (e.g., AMFs 430a, b) via respective NG-C interfaces and to the UPF (User Plane Function) 440 (e.g., UPFs 440a,b) via respective NG-U interfaces. Moreover, the AMFs 430a,b can communicate with one or more policy control functions (PCFs, e.g., PCFs 450a,b) and network exposure functions (NEFs, e.g., NEFs 460a,b).

Each of the gNBs 410 can support the NR radio interface including frequency division duplexing (FDD), time division duplexing (TDD), or a combination thereof. In contrast, each of ng-eNBs 420 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 411a-b and 421a-b shown as exemplary in FIG. 4. In some embodiments, the gNBs and ng-eNBs can also use various directional beams to provide coverage in the respective cells. FIG. 4 further illustrates a UE 405 operating in dual-connectivity (DC) with gNB 410a and ng-eNB 420a via cells 411a and 421a, respectively.

3GPP TR 38.804 describes various exemplary dual-connectivity (DC) scenarios or configurations in which the MN and SN can apply either NR, LTE or both. The DC arrangement shown in FIG. 4 can be either NGEN-DC (an ng-eNB acts as MN and a gNB that acts as SN) or NE-DC (a gNB acts as MN and a ng-eNB acts as a SN). Alternately, UE 404 can be connected in DC with gNBs 410a and 410b via cells 411a and 411b, respectively. This alternative arrangement whereby MN and SN employ NR is known as NR-DC.

Figure 5:
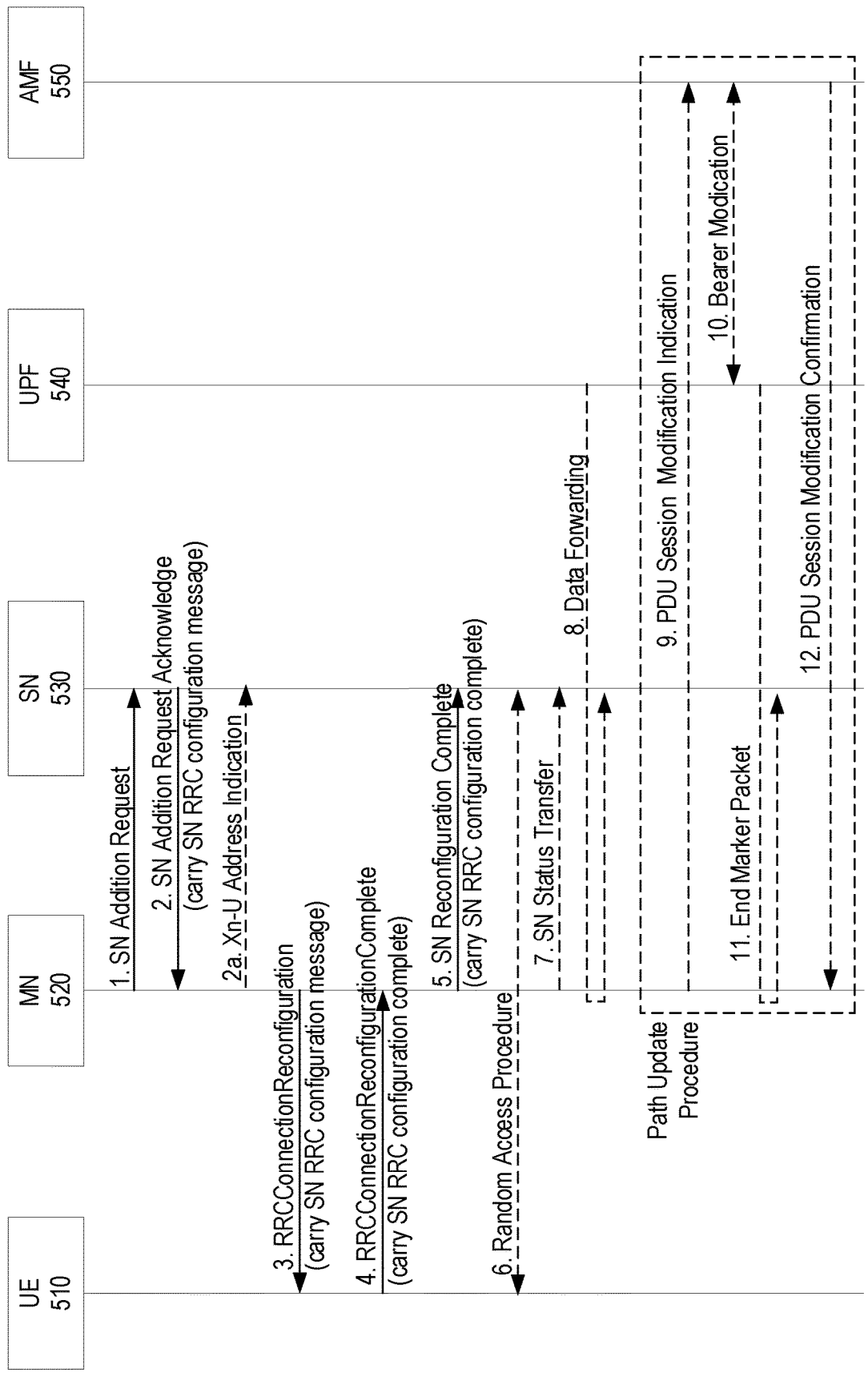
FIG. 5 illustrates an exemplary secondary node (SN) addition procedure for NR-DC cases using a 5G core network (5GC), according to various exemplary embodiments of the present disclosure.

FIG. 5 illustrates an exemplary secondary node (SN) addition procedure for NR-DC cases utilizing a 5GC. The involved entities include a UE (510), MN (520), SN (530), UPF (540), and AMF (550). These entities will be referred to without their reference numbers in the following description.

The SN Addition procedure is initiated by the MN and is used to establish a UE context at the SN in order to provide radio resources from the SN to the UE. For bearers requiring SCG radio resources, this procedure can be used to add at least the initial serving cell of the SCG. This procedure can also be used to configure an SN-terminated MCG bearer (where no SCG configuration is needed). The operations shown in the exemplary procedure of FIG. 5 are labelled numerically but this is used only to facilitate clarity in the following description. In other words, the numerical order is exemplary and the order of the various operations can be rearranged in certain embodiments. Dashed lines indicate optional operations whose performance may depend on one or more conditions.

In operation 1, the MN sends an SN Addition Request message to request the target SN to allocate radio resources for one or more specific PDU Sessions/QoS Flows, indicating QoS Flows characteristics (QoS Flow Level QoS parameters, PDU session level transport network layer (TNL) address information, and PDU session level Network Slice info). For example, the TNL address information can include a GPRS Tunneling Protocol (GTP) Tunnel Endpoint Identifier (TEID) and a TNL Internet Protocol (IP) address, such as defined in 3GPP TS 38.423 (v15.0.0). This TNL address information generally identifies a "tunnel." Accordingly, in the following description, the terms "tunnel information," "tunnel identifier(s)," and "TNL address information" are used interchangeably.

In addition, for bearers requiring SCG radio resources, MN indicates the requested SCG configuration information, including the entire UE capabilities and the UE capability coordination result. In this case, the MN also provides the latest measurement results for the SN to use when choosing and configuring the SCG cell(s). The MN can also request the SN to allocate radio resources for split SRB operation. The MN can also provide the needed security information to the SN (e.g., even if no SN-terminated bearers are setup) to enable SRB3 to be setup based on SN decision.

For MN-terminated bearer options that require Xn-U resources between the MN and the SN, MN can also provide Xn-U TNL address information. For SN terminated bearers, the MN can provide a list of available DRB IDs. The S-NG-RAN node shall store this information and use it when establishing SN terminated bearers. The SN may reject the request.

For SN terminated bearer options that require Xn-U resources between the MN and the SN, the MN provides in step 1 a list of QoS flows per PDU Sessions for which SCG resources are requested to be setup upon which the SN decides how to map QoS flows to DRB.

For split bearers, MCG and SCG resources may be requested of such an amount, that the QoS for the respective QoS Flow is guaranteed by the exact sum of resources provided by the MCG and the SCG together, or even more. For MN terminated split bearers, the MN decision is reflected in operation 1 by the QoS Flow parameters signaled to the SN, which may differ from QoS Flow parameters received over NG interface.

For a specific QoS flow, the MN may request the direct establishment of SCG and/or split bearers, i.e., without first having to establish MCG bearers. It is also allowed that all QoS flows can be mapped to SN terminated bearers, i.e., there is no QoS flow mapped to an MN terminated bearer.

In operation 2, If the RRM entity in the SN is able to admit the resource request, it allocates respective radio resources and, dependent on the bearer type options, respective transport network resources. For bearers requiring SCG radio resources the SN triggers UE Random Access so that synchronization of the SN radio resource configuration can be performed. The SN decides the PScell and other SCG SCells and provides the new SCG radio resource configuration to the MN in a SN RRC configuration message contained in the SN Addition Request Acknowledge message sent in operation 2. In case of bearer options that require Xn-U resources between the MN and the SN, the SN provides Xn-U TNL address information for the respective DRBs, Xn-U UL TNL address information for SN-terminated bearers, and Xn-U DL TNL address information for MN terminated bearers. For SN-terminated bearers, the SN provides the NG-U DL TNL address information for the respective PDU Session and security algorithm. If SCG radio resources have been requested, the SCG radio resource configuration is provided.

In case of MN-terminated bearers, transmission of user plane data may take place after operation 2. In case of SN-terminated bearers, data forwarding and the SN Status Transfer may take place after operation 2. For MN-terminated NR SCG bearers for which PDCP duplication with CA is configured, the MN allocates two separate Xn-U bearers. For SN terminated NR MCG bearers for which PDCP duplication with CA is configured the SN allocates two separate Xn-U bearers.

In optional operation 2a, For SN terminated bearers using MCG resources, the MN provides Xn-U DL TNL address information in an Xn-U Address Indication message.

In operation 3, the MN sends the MN RRC reconfiguration message to the UE including the SN RRC configuration message, preferably without modifying it. In operation 4, the UE applies the new configuration and replies to MN with MN RRC reconfiguration complete message, including a SN RRC response message for SN, if needed. In case the UE is unable to comply with (part of) the configuration included in the MN RRC reconfiguration message, it performs the reconfiguration failure procedure. In operation 5, the MN informs the SN that the UE has completed the reconfiguration procedure successfully via SN Reconfiguration Complete message, including the encoded SN RRC response message, if received from the UE.

In operation 6, if configured with bearers requiring SCG radio resources, the UE performs synchronization towards the PSCell configured by the SN. The order in which the UE sends the MN RRC reconfiguration complete message and performs the Random-Access (RA) procedure towards the SCG is not defined. Moreover, a successful RA procedure towards the SCG is not required for a successful completion of the RRC Connection Reconfiguration procedure. In operation 7, in case of SN-terminated bearers using RLC AM, the MN sends SN Status Transfer to the SN.

In operation 8, in case of SN-terminated bearers or QoS flows moved from the MN, and dependent on the bearer characteristics of the respective QoS Flows, the MN may take actions to minimize service interruption due to activation of MR-DC (e.g., data forwarding). In operations 9-12, for SN-terminated bearers, the update of the UP path towards the 5GC is performed via PDU Session Path Update procedure.

Figure 6:
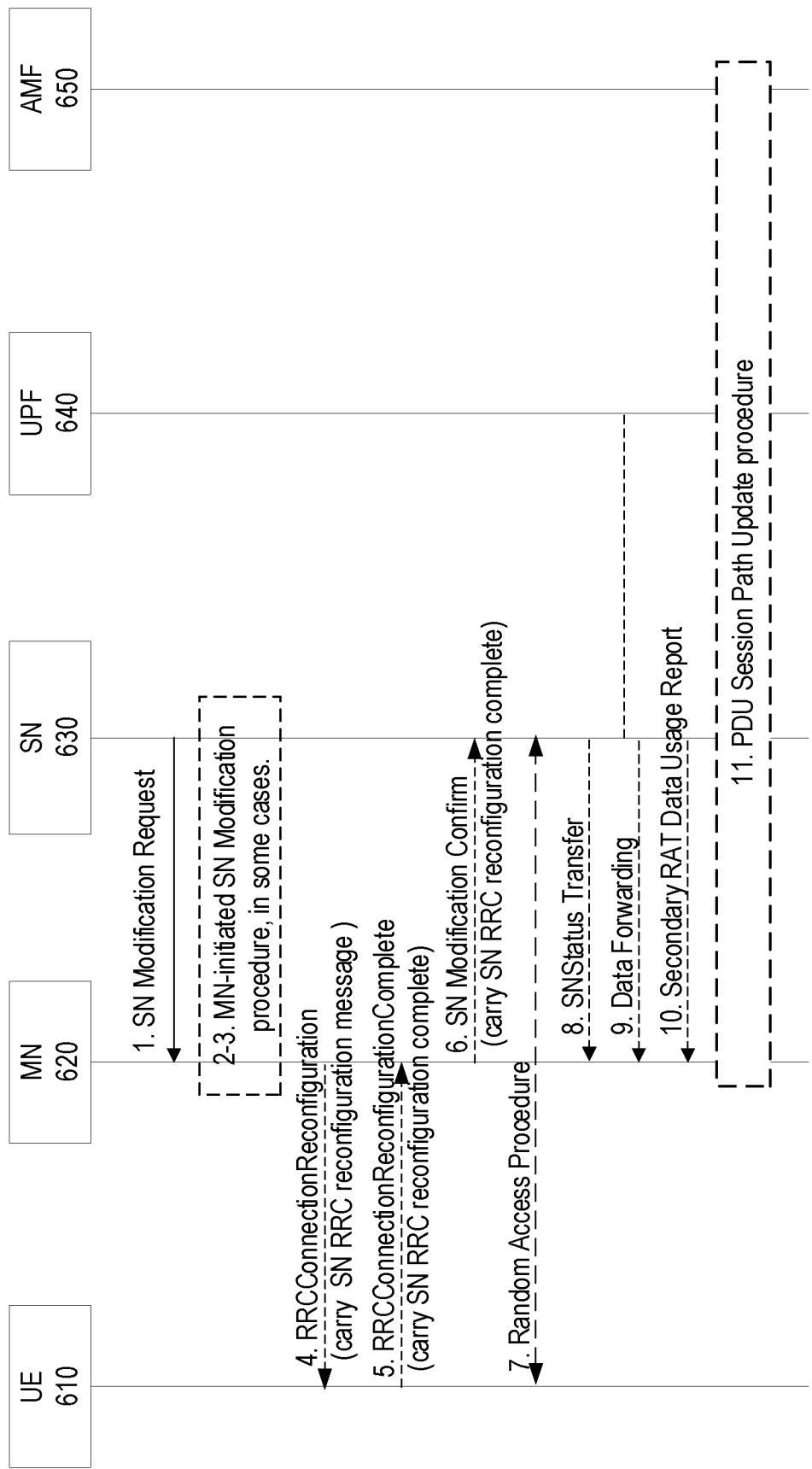
FIG. 6 illustrates an exemplary secondary node (SN) modification procedure for NR-DC scenarios using a 5GC, according to various exemplary embodiments of the present disclosure.

FIG. 6 illustrates an exemplary secondary node (SN) modification procedure for NR-DC scenarios utilizing a 5GC network. The involved entities include a UE (610), MN (620), SN (630), UPF (640), and AMF (650). These entities will be referred to without their reference numbers in the following description.

The SN Modification procedure shown in FIG. 6 can be initiated by the SN, with MN involvement, for various purposes. These purposes can include performing configuration changes of the SCG within the same SN, such as to trigger modification/release of the user plane resource configuration and to trigger PSCell changes (e.g., when a new security key is required or when the MN needs to perform PDCP data recovery). The MN cannot reject the request for release or PDU session/QoS flows. The SN can also use the procedure to request the MN to provide more DRB IDs to be used for SN terminated bearers or to return DRB IDs used for SN terminated bearers that are no longer needed.

The operations shown in the exemplary procedure of FIG. 6 are labelled numerically but this is used only to facilitate clarity in the following description. In other words, the numerical order is exemplary and the order of the various operations can be rearranged in certain embodiments. Dashed lines indicate optional operations whose performance may depend on one or more conditions.

In operation 1, the SN sends the SN Modification Request message, which can contain user plane resource configuration-related context, other UE context related information, and the new radio resource configuration of the SCG. The SN can decide whether the change of security key is required. In case of change of security key, an included PDCP Change Indication can indicates that an SN security key update is required. In case the MN needs to perform PDCP data recovery, the PDCP Change Indication can indicate that PDCP data recovery is required.

In operations 2-3 (shown as a single block), an MN-initiated SN Modification procedure may be triggered by SN Modification Required message, e.g., when an SN security key change needs to be applied. For SN terminated NR MCG bearers to be setup for which PDCP duplication with CA is configured, the SN allocates two separate Xn-U bearers.

In operation 4, the MN initiates the RRC connection reconfiguration procedure towards the UE, including sending a SN RRC configuration message. The UE applies the received configuration and replies (operation 5) with MN RRC reconfiguration complete message, which includes a SN RRC response message, if needed. In case the UE is unable to comply with (all or part of) the configuration included in the MN RRC reconfiguration message, it performs a reconfiguration failure procedure instead. In operation 6, upon successful completion of the reconfiguration, the MN indicates this success in an SN Modification Confirm message sent to the SN. This message can carry, e.g., a SN RRC reconfiguration complete message.

In operation 7, if instructed, the UE performs synchronization towards the PSCell of the SN as described in SN Addition procedure discussed above. Otherwise, the UE can perform UL transmission after having applied the new configuration. In operation 8, if a PDCP termination point is changed for bearers using RLC acknowledged mod (AM), and if RRC full configuration is not used, the MN sends the SN Status transfer message to the SN. In operation 9, if applicable, data forwarding between MN and the SN takes place, with FIG. 6 illustrating the case where a user plane resource configuration-related context is transferred from the SN to the MN. In operation 10, the SN sends a Secondary RAT Data Usage Report message to the MN and includes the data volumes delivered to and received from the UE.

In operation 11, a PDU Session Path Update procedure is performed between the MN and the 5GC. This operation corresponds to operations 9-12 shown in FIG. 5.

As briefly discussed above, in some scenarios, MCG and SCG may not be co-located and their implementation may not allow for close coordination of their respective schedulers. In these scenarios, network scheduling decisions for UE UL transmissions may not be fully coordinated between MCG and SCG, such that the UE may need to use power sharing mechanisms to distribute the transmission power across the two cell groups.

Conventional solutions are based on the UE determining a time offset (Toffset) such that the UE (e.g., configured with NR-DC) expects the MCG to schedule an UL transmission starting at time T by a scheduling message received no later than time T-Toffset. However, these conventional solutions are based on the UE having knowledge of both the MCG and SCG configurations to determine Toffset. In certain uncoordinated scenarios, however, neither MCG nor SCG has knowledge of the other's configuration, which can cause various issues, difficulties, and/or problems for supporting DC in NR networks.

In particular, conventional solutions are based on UE capability signaling to the network, in which the UE indicates one of two capabilities for Toffset calculation, defined based on the maximum of sets of UL processing times across the configurations of SCG and MCG. More specifically, according to current 3GPP RAN1 working assumptions, the UE capability can indicate one of following two alternatives for Toffset calculation:

1. "DPS without look-ahead," where Toffset=max $\{T_{proc,MCG}^{max}, T_{proc,SCG}^{max},\}$ and:
   $T_{proc,MCG}^{max}$ is the maximum UE processing time among any of the possible values from $T_{proc,2}$, $T_{proc,CSI}$, $T_{proc,release}^{mux}$, $T_{proc,2}^{mux}$, and/or $T_{proc,CSI}^{mux}$ as specified in 3GPP TS 38.213 and 38.214 based on the configurations for the MCG.
   $T_{proc,SCG}^{max}$ is the maximum UE processing time among any of the possible values from $T_{proc,2}$, $T_{proc,CSI}$, $T_{proc,release}^{mux}$, $T_{proc,2}^{mux}$, and/or $T_{proc,CSI}^{mux}$ as specified in 3GPP TS 38.213 and 38.214 based on the configurations for the SCG.

2. "DPS with look-ahead," where Toffset=−max $\{T_{proc,MCG}^{max}, T_{proc,SCG}^{max},\}$ and:
   $T_{proc,MCG}^{max}$ is the maximum UE processing time among any of the possible values from $T_{proc,2}$, $T_{proc,CSI}$ $T_{proc,release}^{mux}$, and/or $T_{proc,2}^{mux}$, as specified in 3GPP TS 38.213 and 38.214 based on the configurations for the MCG.
   $T_{proc,SCG}^{max}$ is the maximum UE processing time among any of the possible values from $T_{proc,2}$, T proc,CSI, $T_{proc,release}^{mux}$ and/or $T_{proc,2}^{mux}$ as specified in 3GPP TS 38.213 and 38.214 based on the configurations for the SCG.

Some of the parameters referenced above can be further explained as follows. When a UE is configured with NR-DC operation and has uplink transmissions in MCG and in SCG in the same frequency range, the following text of 3GPP 38.213 v17.0.0 represents the agreed-upon UE power control determination for NR-DC:

*Begin 3GPP 38.213 v. 17.0.0 specification text as agreed by RAN1*
If a UE
 is provided NR-DC-PC-mode=Dynamic, and
 indicates a capability to determine a total transmission power on the SCG at a first symbol of a transmission occasion on the SCG by determining transmissions on the MCG that
  are scheduled by DCI formats in PDCCH receptions with a last symbol that is earlier by more than $T_{offset}$ from the first symbol of the transmission occasion on the SCG, and
  overlap with the transmission occasion on the SCG
the UE determines a maximum transmission power on the SCG at the beginning of the transmission occasion on the SCG as
  $\min(\hat{P}_{SCG}, \hat{P}_{Total}^{NR-DC} - \hat{P}_{MCG}^{actual})$, if the UE determines transmissions on the MCG with a $\hat{P}_{MCG}^{actual}$ total power
  $\hat{P}_{Total}^{NR-DC}$, if the UE does not determine any transmissions on the MCG where
 $T_{offset} = \max\{T_{proc,MCG}^{max}, T_{proc,SCG}^{max}\}$,
 $T_{proc,MCG}^{max}$ and $T_{proc,SCG}^{max}$ is the maximum of $T_{proc,2}$, $T_{proc,CSI}$, $T_{proc,release}^{mux}$, $T_{proc,2}^{mux}$, and $T_{proc,CSI}^{mux}$ based on the configurations on the MCG and the SCG, respectively, when the UE indicates a first value for the capability, and
 $T_{proc,MCG}^{max}$ and $T_{proc,SCG}^{max}$ is the maximum of $T_{proc,2}$, $T_{proc,CSI}$, $T_{proc,release}^{mux}$, $T_{proc,2}^{mux}$ based on the configurations on the MCG and the SCG, respectively, when the UE indicates a second value for the capability
The UE does not expect to have transmissions on the MCG that
 are scheduled by DCI formats in PDCCH receptions with a last symbol that is earlier by less than or equal to $T_{offset}$ from the first symbol of the transmission occasion on the SCG, and
 overlap with the transmission occasion on the SCG
*End 3GPP 38.213 v. 17.0.0 specification text as agreed by RAN1*

To summarize, for a UE configured with NR-DC and dynamic power sharing, if the UE is scheduled to perform UL transmission on SCG starting at time T, the UE does not expect to receive any scheduling messages after time T-Toffset for an MCG UL transmission that starts at time T or overlapping with an SCG uplink transmission that starts at time T. As described in more detail above, the UE can indicate one of the two alternative capabilities for Toffset determination, referred to as "DPS with look-ahead" and "DPS without look-ahead."

Figure 7:
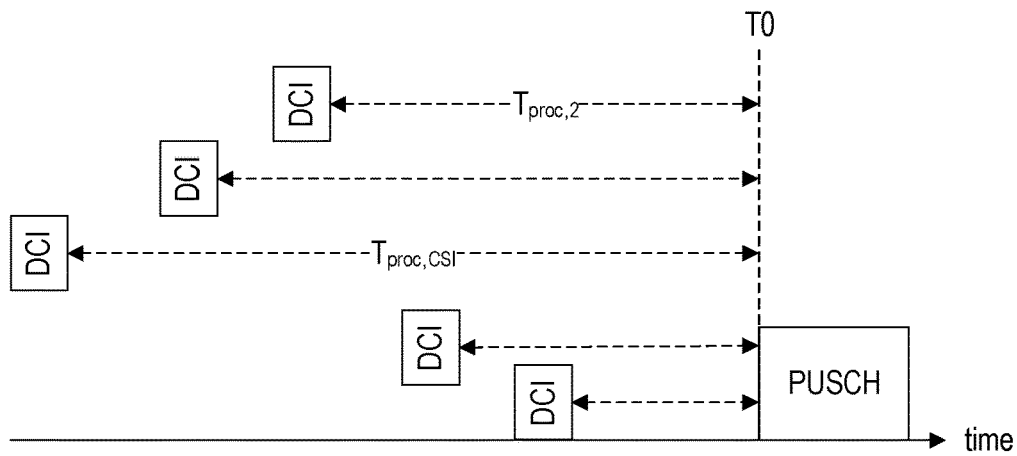
FIGS. 7-8 illustrate various timing relationships for UE uplink (UL) transmissions.

FIG. 7 shows an illustration of minimum UE processing time (including $T_{proc,2}$ and $T_{proc,CSI}$), DCI reception, and PUSCH transmission for typical UL scenarios. The network should send DL scheduling messages (i.e., in DCI) such that the UE is guaranteed a minimum processing time (shown by horizontal line with arrows) for preparing and transmitting the corresponding UL transmission. The minimum processing time can vary for different uplink transmissions based on UE capability, RRC configuration, particular scheduling message (e.g. if CSI is requested, PUCCH/PUSCH overlap, etc.), and other factors. If the UE's minimum processing time is not satisfied, the UE may not provide a valid UL transmission in response to DL scheduling message. Furthermore, the UE may discard or ignore the scheduling message or consider it invalid.

Figure 8:
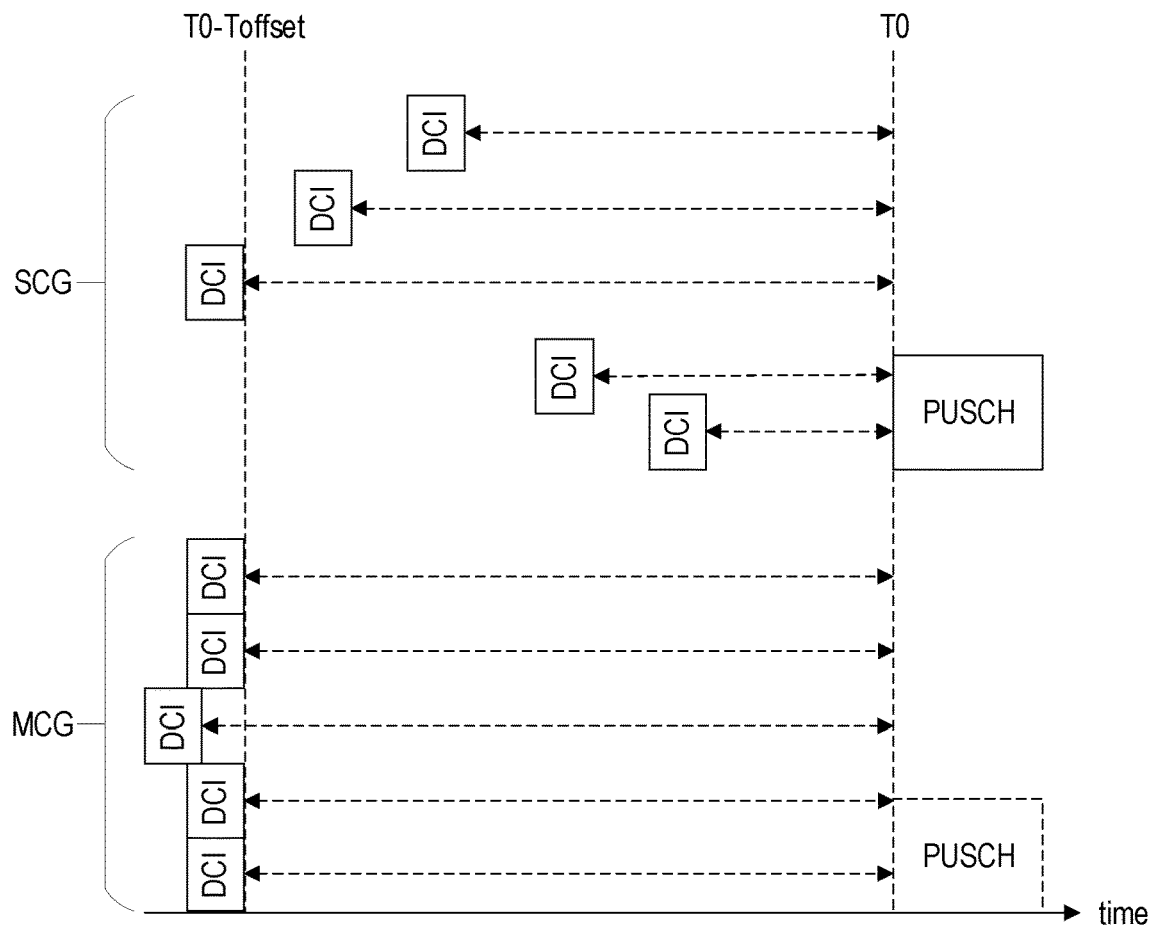

FIG. 8 shows an illustration of minimum UE processing time (including $T_{proc,2}$ and $T_{proc,CSI}$), Toffset, DCI reception, and PUSCH transmission on SCG. FIG. 8 shows a Toffset that is calculated as the largest processing time across MCG and SCG configurations for the UE, e.g., $T_{offset}=\max\{T_{proc,MCG}^{max}, T_{proc,SCG}^{max}\}$. This Toffset becomes a scheduling restriction at the MCG. In other words, for an SCG UL transmission that is scheduled to begin at time T0, the MCG cannot schedule any overlapping MCG UL transmission unless the MCG scheduling message is received by the UE before time T0-Toffset. Thus, the possible PUSCH transmission (shown in dotted box) of MCG can be scheduled only by DCIs received before T0-Toffset. In FIG. 8, the minimum processing times are shown by horizontal lines with arrows.

Table 1 below illustrates exemplary UE Toffset determinations corresponding to the first and second capability values reported by the UE. The exemplary determinations shown in Table 1 use exemplary values for the various parameters for two different sub-carrier spacing (or numerologies), e.g., 15 kHz and 30 kHz. Table 1 also assumes no BWP switching and with PDSCH/PUSCH processing capability 1. In this example, it is assumed that for second capability value, parameter $T_{proc,CSI}$ is not applicable.

TABLE 1

Exemplary Toffset analysis.

| | First capability value (no look-ahead) | | Second capability value (look-ahead) | |
|---|---|---|---|---|
| | 15 kHz | 30 KHz | 15 kHz | 30 KHz |
| Tproc, 2 | 0.85 ms | 0.46 ms | 0.85 ms | 0.46 ms |
| Tproc, CSI | 0.7 to 2.85 ms | 0.46 to 2.57 ms | 0.7 to 2.85 ms | NA |
| Tmux, proc, release | 0.78 ms | 0.46 ms | 0.78 ms | 0.46 ms |
| Tmux, proc2 | 0.85 ms | 0.5 ms | 0.85 ms | 0.5 ms |
| Tmux, proc, CSI | 0.85 to 3 ms | 0.5 to 2.64 ms | N/A | N/A |
| Toffset | 3 ms | 2.64 ms | 2.85 ms | 0.5 ms |

As briefly mentioned above, under current assumptions, knowledge of both the MCG and SCG configurations is needed in order to determine max $\{T_{proc,MCG}^{max}, T_{proc,SCG}^{max},\}$ for both UE capability values. As illustrated in Table 1 above, the UE will have the knowledge of both the MCG and SCG configuration and can thus calculate Toffset. On the network side, however, there are some scenarios where neither MN (or MCG) nor SN (or SCG) knows the other's configuration. Currently, there is no way for the SN to determine the MCG configuration and it is not sent explicitly to the SN by the MN via current inter-node RRC signaling specified in 3GPP TS 38.331.

Instead, the SCG configuration is passed within a container (i.e., OCTET STRING) from the SN to the MN, but the MN is not required to process the container to understand the SCG configuration. Instead, the MN can simply include the octet string in the RRCReconfiguration message sent to the UE, as discussed above. Currently the MN receives all information it needs to know about the SCG configuration via other fields of the inter-node RRC messages. The same applies to the SN regarding the MCG configuration.

Furthermore, requiring the MN to process and understand the SCG configuration received in this manner would put an extra burden on the MN implementation. For example, the MN would need to decode and parse through the required parts of the SCG configuration in order to determine $T_{proc,SCG}^{max}$. In deployments where MN and SN support different specification releases, or even different RATs, this becomes a significant burden for MN and SN and thus a significant motivation for not requiring MN and SN to decode and/or understand each other's configurations.

Accordingly, under conventional techniques and current assumptions, determining Toffset on the network side is not possible. Even so, at least the MN needs to know Toffset supported by the UE in order to determine scheduling offsets, e.g., from PDCCH to scheduled PUSCH transmission, from PDSCH to HARQ-ACK transmission, etc. As such, a solution that can ensure that at least MN (or MCG) and UE (and possibly the SCG) have the same knowledge of Toffset is needed. Moreover, the current mechanisms also result in additional network scheduling restrictions especially when SCG UL transmissions span multiple slots and solutions to reduce the scheduling restrictions are also needed.

Exemplary embodiments of the present disclosure address these and other problems, difficulties, and/or issues by providing techniques and/or mechanisms that allow a MN to properly identify and schedule UE's UL transmissions in a manner that satisfies the UE's Toffset capability. Such embodiments can facilitate enable inter-gNB signaling (e.g., inter node RRC messages) to exchange necessary information for MN and SN to ensure that the UE Toffset capability is not exceeded or violated. Such embodiments can facilitate MN and SN coordination via inter-gNB signaling to identify a better estimate of Toffset that MN can assume for scheduling the UE in the MCG. Although embodiments are described primarily in terms of NR-DC, such techniques and/or mechanisms can also be applied to various MR-DC options to provide similar benefits and/or advantages.

At a high level, some embodiments include sending various information from MN to SN. This information can include a restriction on Toffset that the SN must follow when deciding the SCG configuration, such that $T_{proc,SCG}^{max}$ is less than the restriction value. This restriction value may be called maxToffset or equivalently minToffset, since it represents a maximum of a minimum value (UE processing time). By setting maxToffset, the MN knows the scheduling offset it can apply when scheduling UE on MCG. Alternately, this information can include a restriction on $T_{proc,SCG}^{max}$ (called maxT-SCG) that the SN must respect when deciding the SCG configuration, to ensure that $T_{proc,SCG}^{max}$ <maxT-SCG. The information can also include a restriction on maximum allowed SCG UL transmission length (called max-allowedSCGtxlength) that the SN must respect when scheduling SCG transmissions. This can allow the MN to determine MCG UL scheduling occasions more efficiently.

At a high level, some embodiments include sending various information from SN to MN. This information can include a request for change in the maxToffset or maxT-SCG and/or max-allowedSCGtxlength restrictions imposed by the MN. The SN may request MN to increase/decrease maxToffset or maxT-SCG and/or max-allowedSCGtxlength. It is up to the MN to decide whether to and if so how to respond to the SN request.

Also, in some embodiments, the MN and SN can also share their respective associated reference processing times ($T_{proc,MCG}^{max}$, $T_{proc,SCG}^{max}$) at MCG and SCG, respectively. They can also share their respective UL transmsisons lengths used for PUSCH and PUCCH. Such shared information can be used by MN and SN for more efficient scheduling, e.g. by deriving a reasonable estimate or tighter upper bound for maxToffset.

A first group of embodiments are based on a principle of MN and SN coordination with each other to ensure the UE Toffset capability is not violated. This is performed without calculating the actual value of Toffset; instead, MN and SN exchange values of maxToffset, T_MCG, and T_SCG.

In these embodiments, the MN can select a maxToffset that the MN uses for scheduling MCG and that the SN must respect when selecting the SCG configuration. Because only the UE knows the exact values of both $T_{proc,MCG}^{max}$ and $T_{proc,SCG}^{max}$, this maxToffset can be equal to or greater than the Toffset that the UE determines. Moreover, there may be benefits for MN and SN coordination to identity a maxToffset that a MN can use when scheduling the UE on the MCG without exceeding the UE Toffset capability.

The MN does not schedule any overlapping MCG UL transmission after T–maxToffset, as discussed below. Once maxToffset is known by both MN and SN, then MN and SN can schedule the UE accordingly on MCG and SCG, respectively. As long as maxToffset is larger than or equal to Toffset determined by the UE, then there is no issue. Even so, one implication is that MN may be scheduling UE more slowly on MCG than the UE is capable of supporting.

In some embodiments, the network can inform the UE of the maxToffset (via RRC signaling) so that the UE also knows the restriction being used by the network. For example, if the UE's actual Toffset was 0.5 ms but the MN chooses 2-ms scheduling delay for MCG, this knowledge can facilitate more relaxed processing by the UE.

In some embodiments, in addition to maxToffset, the MN can inform SN of a T_MCG (also called $T_{proc,MCG}^{max}$) calculated based on the UE capabilities and selected MCG configuration. The SN must still respect the maxToffset but knowing also the T_MCG could aid the SN in deciding whether to request a change in the maxToffset. For example, the MN may have selected an MCG configuration resulting in a T_MCG<maxToffset, if it wants to give some freedom for SN to select an SCG configuration. If the SN then selects an SCG configuration that also provides a T_SCG<maxToffset (described in more detail below), it can either ask the MN for a lower maxToffset or provide T_SCG to MN so that MN can update maxToffset and schedule UEs with shorter offset. In other embodiments, the MN can also inform the SN of a reference T_MCG value that the MN would not exceed for any selected MCG configuration for the UE, including any potential reconfigurations.

In some embodiments, the SN can inform the MN of a T_SCG (also called $T_{proc,SCG}^{max}$) calculated based on the UE capabilities and selected SCG configuration. The MCG can use this information to adjust the maxToffset. In some cases, where maxToffset is communicated on the inter-gNB interface, the SN can apply some scheduling restrictions so UE is not burdened. For example, the SN can give some guarantee to a UE that when UE is scheduled for an UL transmission on SCG, that UL transmission will not have T_SCG>maxToffset. For example, if maxToffset is 1.5 ms, then UE cannot be scheduled on SCG for an operation (e.g., a CSI reporting) that will need 3 ms processing time. Likewise, in this same example, UE cannot be configured with multiple BWPs with DCI-based switching that requires more than 1.5 ms. In other embodiments, the SN can also inform the MN of a reference T_SCG value that the SN will not exceed for any selected SCG configuration for the UE, including any reconfigurations.

In another alternative, the MN and the SN exchange the value of a parameter maxT-SCG (i.e., a maximum allowed value of T_SCG=$T_{proc,SCG}^{max}$). For example, the MN can indicate the maxT-SCG to SN using inter-node or Xx-AP messages described below. The SN can ensure that $T_{proc,SCG}^{max}$ is less than or equal to the maxT-SCG indicated by the MN by selecting appropriate RRC parameters for the SCG configuration (e.g., parameters related to Codebook-Type for CSI reporting, number of BWPs configured for an SCG serving cell, CSI reporting type, sub-carrier spacing configuration, etc.).

If the MN configures the MCG such that $T_{proc,MCG}^{max}$>maxT-SCG, Toffset would be as large as $T_{proc,MCG}^{max}$ configured by the MN. If the MN configures the MCG such that $T_{proc,MCG}^{max}$<maxT-SCG, then Toffset would be bounded by maxT-SCG. In some cases, indication of maxT-SCG can reduce signaling overhead or provide more flexibility for the MN to choose its MCG configuration as compared to signaling of maxToffset.

In some embodiments, the signaling between MN and SN may be done by inter-node RRC messages. In this case, new fields for maxToffset or maxT-SCG and T_MCG can be added in configRestrictInfo information element (IE) of inter node message CG-ConfigInfo from MN to SN. For SN to MN signaling, T_SCG can be added in configRestrictMo-dReq or CG-Config IEs. In other embodiments, the signaling between MN and SN may be done by Xx-AP messages. In this case, new fields for maxToffset or maxT-SCG, T_MCG, and T_SCG can be added to corresponding messages for each relevant procedure, e.g. SN addition, SN modification, etc.

In various embodiments, once maxToffset is exchanged by signaling, a MN (e.g., gNB) can use it to preclude transmissions on the MCG that: 1) are scheduled by DCI formats in PDCCH receptions with a last symbol that is earlier by less than or equal to maxToffset from the first symbol of the transmission occasion on the SCG, and 2) overlap with the transmission occasion on the SCG. Also, if maxT-SCG is exchanged, the MN can set Toffset such that it is larger than maxT-SCG and preclude transmissions on the MCG that: 1) are scheduled by DCI formats in PDCCH receptions with a last symbol that is earlier by less than or equal to Toffset from the first symbol of the transmission occasion on the SCG, and 2) overlap with the transmission occasion on the SCG.

The signaling between MN and SN according to some embodiments can be done in the context of an MN-initiated SN Addition procedure for NR-DC, such as illustrated in FIG. 5. The following description relates to operations of FIG. 5 that are modified according to these embodiments; other operations shown in FIG. 5 can be maintained as described above.

In operation 1, when requesting resources from the SN, the MN determines and includes maxToffset based on UE capability signaling in the SN Addition Request message to the SN. The included maxToffset is also based on possible MCG configurations (e.g., feature set, feature set combination, etc.) that the MN may use. In some embodiments, the MN can also include the T_MCG based on the MCG configuration to assist SN. Alternately, the MN can determine and include maxT-SCG. This parameter can also be based on UE capability signaling (e.g., including feature set, feature set combination, etc.) and also based on possible MCG configurations that MN intends to use.

In operation 2, after receiving the SN Addition Request message with maxToffset or maxT-SCG, the SN selects an SCG configuration such that the $T_{proc,SCG}^{max}$ is smaller than maxi-SCG or results in a Toffset value smaller than maxT-offset (e.g., Toffset that will be calculated by UE is not larger than maxToffset). The SN sends the selected SCG configuration to the MN in the SN Addition Request Acknowledge message, which will be forwarded to the UE in operation 3. The SN can also include the T_SCG based on the selected SCG configuration in order to inform the MN of the offset used by the SN.

In some embodiments, the SN can also include a request for change (e.g., increase or decrease) in maxToffset or maxT-SCG. Although not shown in FIG. 5, after receiving the SN Addition Request Acknowledge message with such a request, the MN to decide whether to make a change in maxToffset or maxT-SCG. If a change is made, the MN can signal new value(s) to the SN in a further message (not shown in FIG. 5).

Similar modifications can be made to various operations of the SN Modification procedure shown in FIG. 6. For example, the same parameters can be signaled in various messages sent in operations 1-3 shown in FIG. 6.

In general, 3GPP TS specify the UE processing times in units of samples at a very high sampling rate. As such, in some embodiments, the parameters (e.g., maxToffset, maxT-SCG, T_MCG, T_SCG) can be computed to a very fine precision level. In some embodiments, a quantization can used to reduce the number of bits required to signal the parameters between MN and SN. For example, the allowed values for signaling the parameters can be between 0.125 ms and 4 ms with a resolution of 0.125 ms, which can be represented by five bits. In such case, a maxToffset or maxT-SCG of 0.46 ms will be quantized to 0.5 ms, and a five-bit field corresponding to this value will be sent to the SN.

In some embodiments, an upper bound can be applied to the Toffset calculated by the UE to ensure forward compatibility by avoiding very slow processing times due to new features added in the future. An exemplary upper bound can be Toffset=max (Toffset, 5 ms). Such upper bounds can also avoid from negatively impacting NR-DC power control design, e.g., by requiring introduction of new parameter values on the inter-gNB signaling.

In some embodiments, the MN can configure $T_{proc,MCG}^{max}$ such that the Toffset used for MCG scheduling (and assumed by the UE) is larger than the maxToffset indicated to the SN.

A second group of embodiments are based on a principle of UE reporting Toffset capability to SN, and SN negotiating with MN in case it needs to schedule SCG UL transmissions with processing times that would violate the reported Toffset.

For example, if a UE reports a Toffset=1.5 ms, this means that the SN cannot schedule (or even configure the UE for) SCG UL transmissions that need T_SCG>1.5 ms, which the SN calculates based on the UE capabilities and selected SCG configuration. However, if the SN finds that some SCG UL transmissions would need T_SCG>1.5 ms processing time (e.g., BWP switching enabled, A-CSI, etc.), the SN can request the MN to change to Toffset=3 ms. This can be done by inter-node signaling, such as discussed above. If the MN accepts the SN's request, the MN configures the UE to Toffset=3 ms. Subsequently, the SN cannot schedule (or even configure the UE for) SCG UL transmissions that need T_SCG>3 ms. Note that the SN only needs to inform the MN when its preferred T_SCG becomes greater than what it previously provided to the MN, such that every configuration change in SCG does not require an inter-node message.

Another advantage of these embodiments is reduced complexity at the MN. Without such information, to properly identify the upper limit on T_SCG, the MCG may need to process the UE capability including the band/band-combination and feature sets to identify the worst-case SCG configuration. While this may be feasible in principle, it is unnecessarily complex for the MN to parse detailed features sets for an SCG, and very undesirable for network implementation.

The UE's Toffset value can be provided to the MN and SN in various ways. In some embodiments, the UE informs the MN and SN about a new Toffset value. For example, upon the MN addition, a default or starting value can be sent by the MN to the SN via inter-node RRC or X2/Xn signaling. The default Toffset value can be a conservative value such that it can work for both MCG and SCG without coordination. In some cases, the default Toffset value can be pre-configured in the relevant specifications, e.g., 3GPP TS 38.331 or 38.213.

As another example, every time the UE receives a new MCG or SCG configuration, the UE computes Toffset and send the new value (if changed) to the MN via dedicated RRC signaling. In some embodiments, the RRC message can be UEAssistanceInformation, ULInformationTransfer, ULInformationTransferMRDC, or any other existing RRC message send over the UL-DCCH channel. However, new RRC messages can also be defined to include the new value of Toffset. In some embodiments, the UE can send the new Toffset to the SN via the same type of RRC message used to send it to the MN, including any of those described above.

In some embodiments, the UE's provision of Toffset can be upon request by the MN. For example, based on receiving an SCG configuration via inter-node RRC or X2/Xn signaling in a container (e.g., an OCTET STRING as discussed above), the MN determines that the SCG configuration has changed. In response, the MN triggers a UE information request procedure towards the UE to request a new Toffset value. The MN can initiate the UE information request procedure by sending any existing RRC message now sent over the DL-DCCH channel, such as UEInformationRequest, RRCReconfiguration, DLInformationTransfer, DLInformationTransfer-MRDC, etc. New RRC messages can also be defined for this purpose.

As another example, if signaling radio bearer 3 (SRB3) is configured and used by the SN to send an SCG configuration directly to the UE rather than via the MN, the SN informs the MN via an indication in the inter-node RRC or X2/Xn signaling that a new Toffset should be requested or that the SCG configuration has changed. In response to this indication from the SN, the MN triggers the UE information request procedure towards the UE for requesting a new Toffset.

Upon receiving a UE information request from the MN seeking Toffset, the UE can compute Toffset and send it to the MN via an UE information response procedure. In various embodiments, the UE can initiate the UE information response procedure by sending any existing RRC messages now sent over the UL-DCCH channel, such as UEInformationResponse, ULInformationTransfer, ULInformationTransferMRDC, etc. New RRC messages can also be defined for this purpose. In some embodiments, the UE can send the computed Toffset to the SN via the same type of RRC message used to send it to the MN, including any of those described above.

In embodiments where the UE signals Toffset to the MN but not the SN, the MN can adjust the MCG UL transmission scheduling based on the received Toffset, and then signal Toffset it to the SN via inter-node RRC or X2/Xn signaling. As another example, the MN can decide to not change the MCG UL transmission scheduling if the value of the new Toffset is equal to or smaller than the current Toffset. In such case, the MN does not signal the new Toffset to the SN.

Upon receiving a new Toffset from the MN, in some embodiments the SN can store the received Toffset and maintain its current SCG configuration. Alternately, upon receiving the new Toffset from the MN, the SN can send a request for changing (e.g., increasing or decreasing) the signaled Toffset, in the manner described above. Upon receiving such a request, the MN can decide whether to change its MCG configuration to accommodate the SN request and indicate this decision to the SN.

A third group of embodiments can address problems, issues, and/or difficulties with slot aggregation. As mentioned above, in the current design for NR-DC power sharing, it is specified that the UE does not expect to have transmissions on the MCG that: 1) are scheduled by DCI formats in PDCCH receptions with a last symbol that is earlier than the first symbol of the transmission occasion on the SCG by less than or equal to Toffset, and 2) overlap with the transmission occasion on the SCG. Even so, NR allows UE UL transmissions to span a single slot or multiple slots. If an SCG UL transmission spans multiple slots (e.g., when PUSCHpusch-AggregationFactor>1 slot is configured for the UE, or if PUSCH or PUCCH repetition is used) then this can lead to reduced scheduling flexibility for the MCG.

Figure 9:
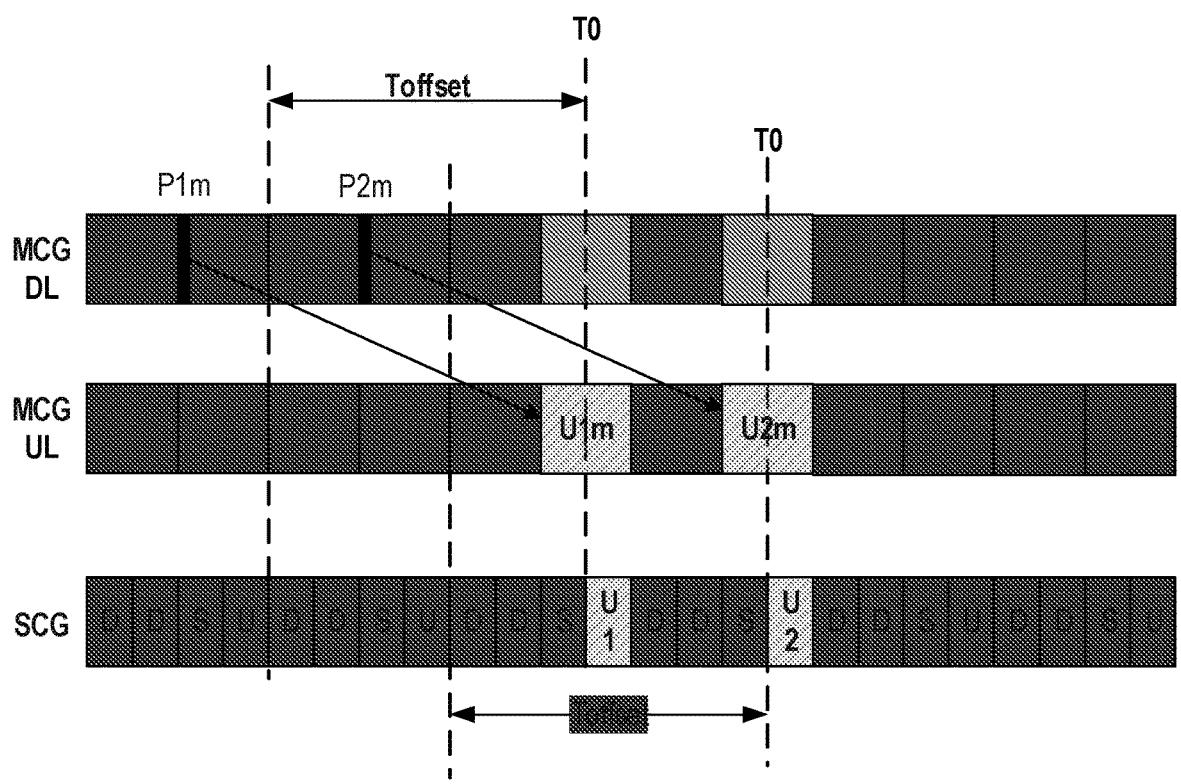
FIG. 9 shows an exemplary scenario in which UE single-slot UL transmissions on SCG and MCG can overlap.

To illustrate, FIG. 9 shows an exemplary scenario in which UE single-slot UL transmissions on SCG and MCG can overlap. FIG. 9 shows an arrangement of uplink ("U"), downlink ("D"), and switching ("S") slots for the SCG, assuming SCG time-division duplexing (TDD) and SCS=30 kHz. FIG. 9 also shows UL and DL slot arrangements for the MCG, assuming frequency-division duplexing (FDD) and an SCS=15 kHz (e.g., such that the MCG slots are twice the length of SCG slots). For an SCG UL transmission, an overlapping MCG UL transmission can be scheduled if the network ensures that UE has at least Toffset between the starting symbol of SCG transmission and the end of PDCCH containing the UL grant for the MCG transmission. As shown in FIG. 9, for SCG UL transmissions U1 and U2, corresponding overlapping MCG UL transmissions U1m and U2m can be triggered by PDDCHs P1m and P2m, respectively. This is because P1m and P2m are at least Toffset ahead of U1 and U2, respectively.

Figure 10:
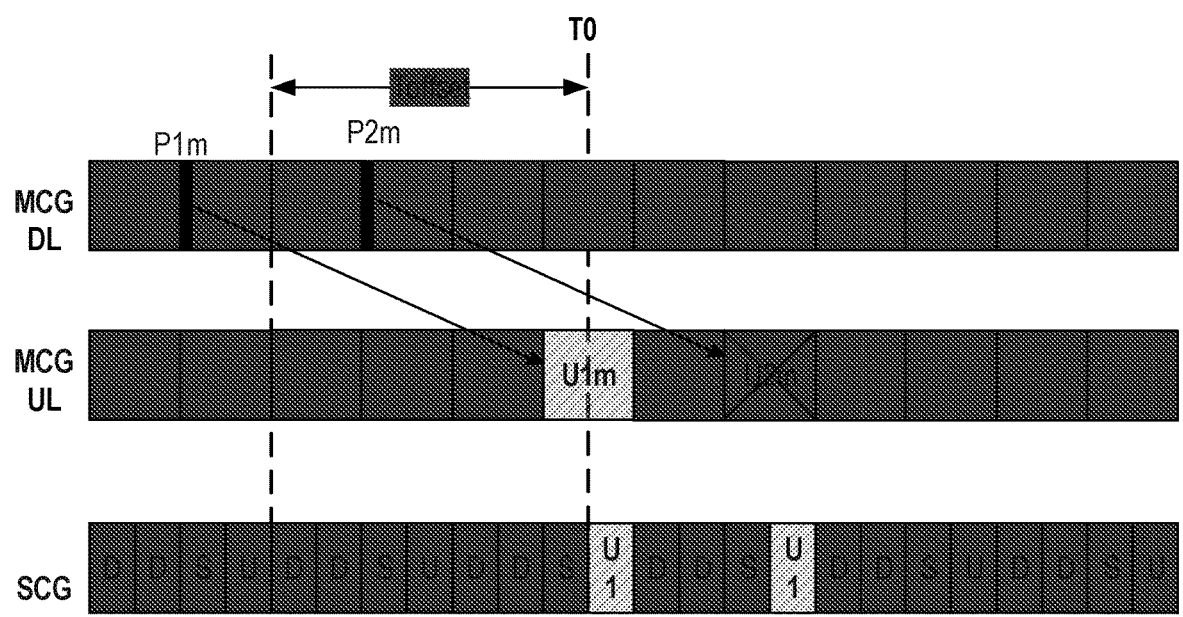
FIG. 10 shows an exemplary scenario in which UE SCG UL transmission spans multiple UL slots.

In contrast, FIG. 10 shows another exemplary scenario in which a scheduled UE SCG UL transmission spans multiple UL slots. Since U1 spans two UL slots, the MCG is restricted from scheduling U2m with PDCCH P2m due to PDCCH P2m having a last symbol that is earlier than the first symbol of an SCG transmission occasion by less than Toffset. Since Toffset is counted from beginning of SCG UL transmission (i.e., first slot of U1 in FIG. 10), the PDCCH P2m does not satisfy this condition and therefore cannot be used to trigger an overlapping UL transmission U2m.

In some embodiments, overlapping multislot UL transmission scenarios, such as shown in FIG. 10, can be addressed by modifying the current specification related to NR-DC power sharing. For example, it can be specified instead that if the SCG UL transmission (or transmission occasion) spans multiple slots, then for each slot of SCG UL transmission (or transmission occasion), the UE does not expect to have transmissions on the MCG that: 1) are scheduled by DCI formats in PDCCH receptions with a last symbol that is earlier than the first symbol of the slot of the transmission occasion on the SCG by less than or equal to Toffset, and 2) overlap with the slot of the transmission occasion on the SCG.

With the above modification, the additional network restrictions on MCG scheduling when SCG UL transmissions span multiple slots are relaxed. For example, PDCCH P2m shown in FIG. 10 is ahead of second slot UL1 transmission by Toffset and so it can be used to trigger overlapping MCG UL transmission U2m. This requires the UE to adjust power for SCG UL transmissions on a slot-by-slot basis by taking into account any overlapping MCG UL transmissions, so long as those MCG UL transmissions are triggered by a PDCCH that is Toffset ahead of the beginning of the slot.

More generally, the term "slot" in the above description can be replaced with other time durations, e.g., a fixed time duration such as 0.5 ms or 0.25 ms, a number of OFDM symbols used for SCG/MCG transmissions, etc. The number of OFDM symbols can be pre-specified/preconfigured, configured by RRC signaling, or indicated by the UE as part of capability signaling.

In other embodiments, the current specification can be retained and combined with the SN indicating a maximum possible SCG transmission length (called max-SCGtxlength) to the MN. With this alternative, the UE can maintain the same power in all slots of a multi-slot SCG transmission. There would be network scheduling restrictions for MCG but these can be mitigated by knowledge of max-SCGtxlength. In other words, the MN need not assume worst case SCG configuration when determining MCG scheduling.

In other embodiments, the current specification can be retained and combined with the MN indicating a maximum allowed SCG transmission length (called max-allowedSCGtxlength) to the SN. In this alternative, the UE can maintain the same power in all slots of a multi-slot SCG transmission. Also, the MN can control the MCG scheduling restrictions by limiting max-allowedSCGtxlength to an appropriate value.

In these embodiments, max-SCGtxlength or max-allowedSCGtxlength can be exchanged between MN and SN via inter-node signaling or Xx-Ap messages using mechanisms similar to those discussed above for exchanging maxToffset or maxT-SCG. For example, such parameters can be sent during SN addition (e.g., as illustrated in FIG. 6) in the same manner discussed above in relation to exchanging maxToffset or maxT-SCG, T_MCG, and T_SCG.

The embodiments described above can be further illustrated with reference to FIGS. 11-12, which depict exemplary methods (e.g., procedures) for network nodes. In other words, various features of the operations described below with reference to FIGS. 11-12 correspond to various embodiments described above. Although the exemplary methods are illustrated by specific blocks in particular orders, the operations corresponding to the blocks can be performed in different orders than shown and can be combined and/or divided into blocks having different functionality than shown. Furthermore, the exemplary methods shown in FIGS. 11-12 can be used cooperatively (e.g., with each other and/or with methods illustrated in FIGS. 5-6), to provide various benefits, advantages, and/or solutions to problems, including those described herein. Optional blocks or operations are indicated by dashed lines.

Note that any differences in formatting (e.g., italics) of the same term in the preceding and following descriptions should not be construed as affecting the meaning of such term.

Figure 11:
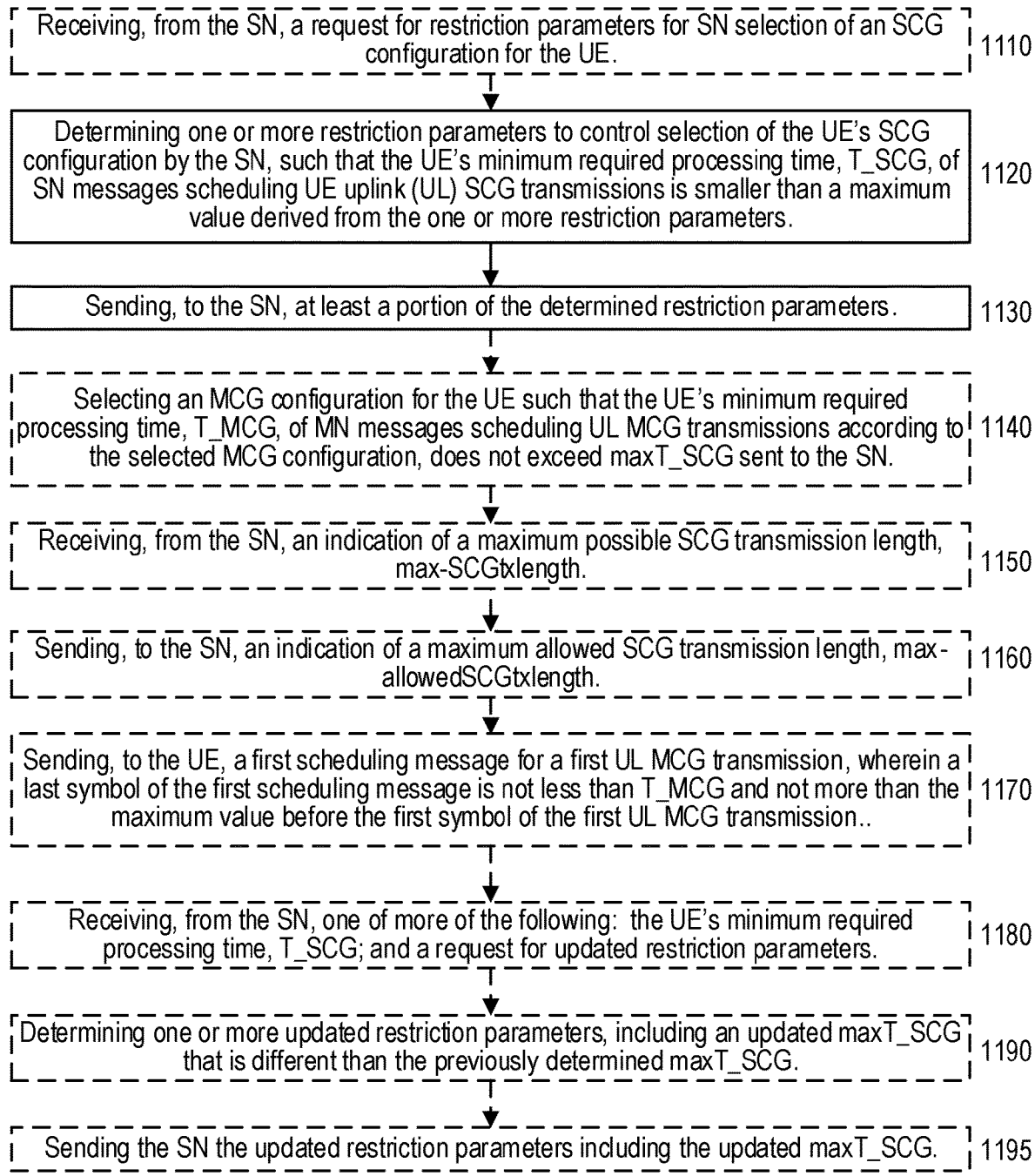
FIG. 11 illustrates an exemplary method (e.g., procedure) for a master node (MN), according to various exemplary embodiments of the present disclosure.

In particular, FIG. 11 illustrates an exemplary method (e.g., procedure) for a master node (MN) configured to provide a master cell group (MCG) in dual connectivity (DC) with a user equipment (UE) together with a secondary node (SN) configured to provide a secondary cell group (SCG), according to various exemplary embodiments of the present disclosure. The exemplary method can be performed by a network node (e.g., base station, eNB, gNB, ng-eNB, etc., or component thereof) in a wireless network (e.g., E-UTRAN, NG-RAN). For example, the exemplary method shown in FIG. 11 can be implemented by a network node configured according to other figures described herein.

The exemplary method can include the operations of block 1120, where the MN can determine one or more restriction parameters to control selection of the UE's SCG configuration by the SN, such that the UE's minimum required processing time, T_SCG, of SN messages scheduling UE uplink (UL) SCG transmissions is smaller than a maximum value derived from the one or more restriction parameters. The exemplary method can also include the operations of block 1130, where the MN can send, to the SN, at least a portion of the determined restriction parameters.

In some embodiments, the one or more restriction parameters sent to the SN include the maximum value. In some of these embodiments, for UE UL SCG transmissions that occur over a plurality of slots, the maximum value is applicable in each particular slot of the plurality. In some of these embodiments, the maximum value is maxT_SCG, which controls selection of the UE's SCG configuration by the SN, such that the UE's minimum required processing time, T_SCG, of SN messages scheduling UL SCG transmissions according to the selected SCG configuration does not exceed maxT_SCG.

In some of these embodiments, the exemplary method can also include the operations of block 1140, where the MN can select an MCG configuration for the UE such that the UE's minimum required processing time, T_MCG, of MN messages scheduling UL MCG transmissions according to the selected MCG configuration, does not exceed maxT_SCG sent to the SN. In some variants, selecting the MCG configuration (in block 1140) can also be based on UE capabilities. In some variants, the restriction parameters sent to the SN also include T_MCG.

In some of these embodiments, the exemplary method can also include the operations of block 1170, where the MN can send, to the UE, a first scheduling message for a first UL MCG transmission. In such embodiments, a last symbol of the first scheduling message is not less than T_MCG and not more than the maximum value before the first symbol of the first UL MCG transmission. In some variants, the exemplary method can also include the operations of block 1150 or block 1160. In block 1150, the MN can receive, from the SN, an indication of a maximum possible SCG transmission length, max-SCGtxlength. In block 1160, the MN can send, to the SN, an indication of a maximum allowed SCG transmission length, max-allowedSCGtxlength. In such embodiments, the first UL MCG transmission is scheduled (e.g., in block 1170) based on max-SCGtxlength or max-allowedSCGtxlength.

In some embodiments where the maximum value is maxT_SCG, the exemplary method can also include the operations of blocks 1180-1195. In block 1180, the MN can receive, from the SN, one of more of the following:
the UE's minimum required processing time, T_SCG, of SN messages scheduling UL SCG transmissions according to an SCG configuration selected by the SN; and
a request for updated restriction parameters for SN selection of an SCG configuration for the UE;

In block 1190, the MN can determining one or more updated restriction parameters, including an updated maxT_SCG that is different than the previously determined maxT_SCG. In block 1195, the MN can send, to the SN, the updated restriction parameters including the updated maxT_SCG. In some of these embodiments, maxT_SCG is greater than T_MCG by a first duration and the updated maxT_SCG is either equal to T_MCG or greater than T_MCG by a second duration that is less than the first duration.

In some embodiments, the one or more restriction parameters include a maximum allowed value, maxToffset, between the following: a last symbol of a scheduling message for a UE UL MCG transmission that overlaps with a UE UL SCG transmission, and a first symbol of the UE UL SCG transmission. In some variants, maxToffset is determined by max(T_MCG, maxT_SCG), where:
T_MCG is the UE's minimum required processing time of MN scheduling messages for UE UL MCG transmissions based on an MCG configuration for the UE; and
maxT_SCG is a maximum allowed value of the UE's minimum required processing time, T_SCG, of SN scheduling messages UE UL SCG transmissions based on an SCG configuration for the UE.

In some embodiments, the one or more restriction parameters can include an indication of the UE's capability of minimum offset between a first symbol of a UE UL SCG transmission and a last received symbol of an earlier scheduling message for a UE UL MCG transmission that overlaps with the UE UL SCG transmission occasion.

In some embodiments, the exemplary method can also include the operations of block 1110, where the MN can receive, from the SN, a request for restriction parameters for SN selection of an SCG configuration for the UE. The at least a portion of the determined restriction parameters is sent to the SN (e.g., in block 1120) in response to the request.

Figure 12:
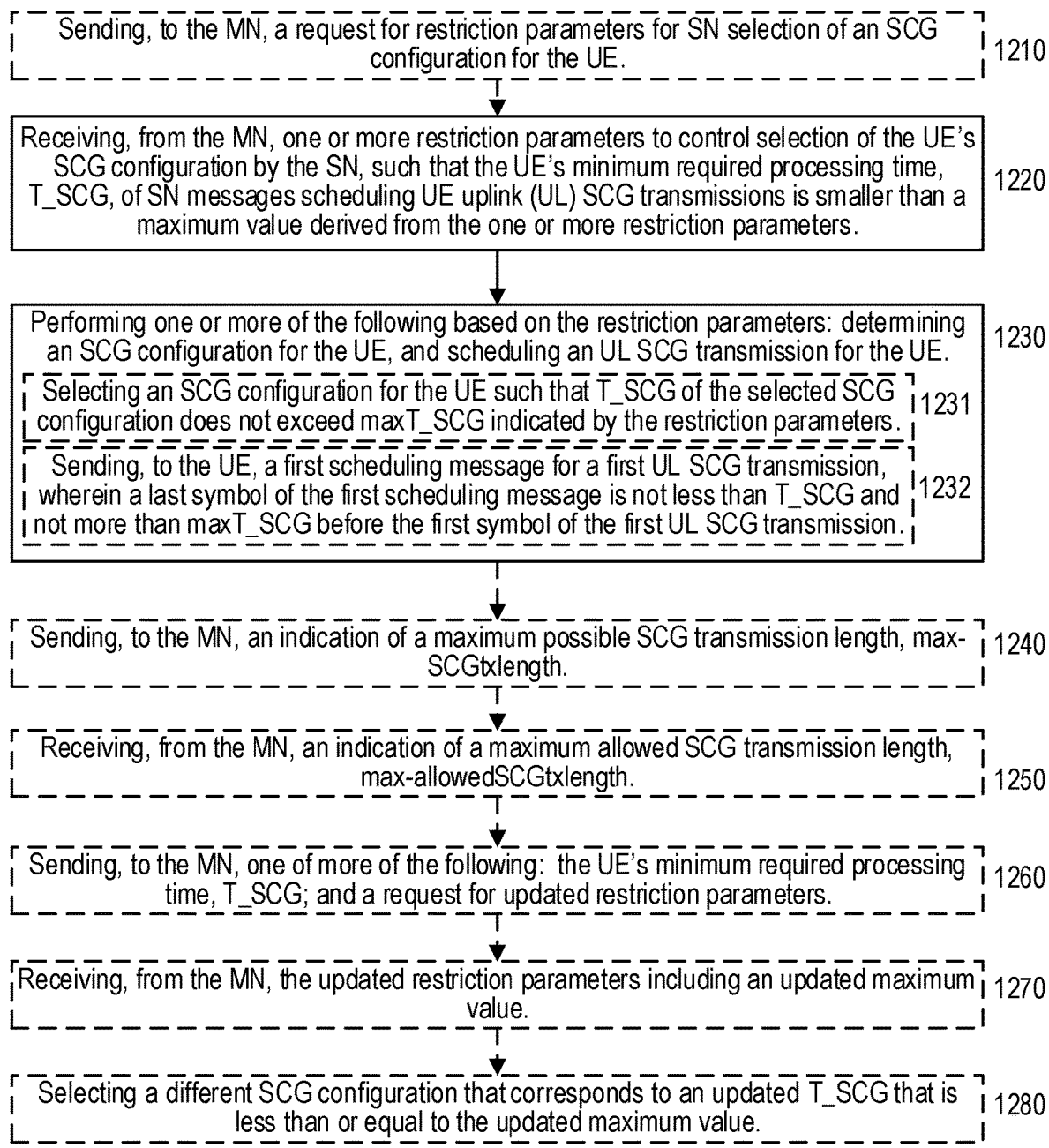
FIG. 12 illustrates an exemplary method (e.g., procedure) for a secondary node (SN), according to various exemplary embodiments of the present disclosure.

In addition, FIG. 12 illustrates an exemplary method (e.g., procedure) for a secondary node (SN) configured to provide a secondary cell group (SCG) in dual connectivity (DC) with a user equipment (UE) together with a master node (MN) configured to provide a master cell group (MCG), according to various exemplary embodiments of the present disclosure. The exemplary method can be performed by a network node (e.g., base station, eNB, gNB, etc., or component thereof) in a wireless network (e.g., E-UTRAN, NG-RAN). For example, the exemplary method shown in FIG. 12 can be implemented by a network node configured according to other figures described herein.

The exemplary method can include the operations of block 1220, where the SN can receive, from the MN, one or more restriction parameters to control selection of the UE's SCG configuration by the SN, such that the UE's minimum required processing time, T_SCG, of SN messages scheduling UE uplink, UL, SCG transmissions is smaller than a maximum value derived from the one or more restriction parameters. The exemplary method can also include the operations of block 1230, where the SN can perform one or more of the following operations based on the one or more parameters: determining an SCG configuration for the UE, and scheduling an UL SCG transmission for the UE.

In some embodiments, the one or more restriction parameters sent to the SN include the maximum value. In some of these embodiments, for UE UL SCG transmissions that occur over a plurality of slots, the maximum value is applicable in each particular slot of the plurality. In some of these embodiments, the maximum value is maxT_SCG, which controls selection of the UE's SCG configuration by the SN, such that the UE's minimum required processing time, T_SCG, of SN messages scheduling UL SCG transmissions according to the selected SCG configuration does not exceed maxT_SCG.

In some of these embodiments, determining an SCG configuration for the UE in block 1230 can include the operations of sub-block 1231, where the SN can select an SCG configuration for the UE such that T_SCG of the selected SCG configuration does not exceed maxT_SCG indicated by the restriction parameters. In some embodiments, selecting the SCG configuration in sub-block 1231 can also be based on UE capabilities. In some variants, the one or more restriction parameters can include an indication of the UE's capability of minimum offset between a first symbol of a UE UL SCG transmission and a last received symbol of an earlier scheduling message for a UE UL MCG transmission that overlaps with the UE UL SCG transmission.

In some of these embodiments, scheduling an UL SCG transmission for the UE in block 1230 can include the operations of sub-block 1232, where the SN can send, to the UE, a first scheduling message for a first UL SCG transmission. In such embodiments, a last symbol of the first scheduling message is not less than T_SCG and not more than maxT_SCG before the first symbol of the first UL SCG transmission. In some variants, the exemplary method can also include the operations of block 1240 or block 1250. In block 1240, the SN can send, to the MN, an indication of a maximum possible SCG transmission length, max-SCGtxlength. In block 1250, the SN can receive, from the MN, an indication of a maximum allowed SCG transmission length, max-allowedSCGtxlength. In such embodiments, the first UL SCG transmission is scheduled (e.g., in sub-block 1232) based on max-SCGtxlength or max-allowedSCGtxlength.

In some embodiments, the restriction parameters also include the UE's minimum required processing time, T_MCG, of MN scheduling messages for UL MCG transmissions based on an MCG configuration for the UE. In such embodiments, T_SCG of the determined SCG configuration (e.g., in sub-block 1231) is greater than or equal to T_MCG.

In some embodiments where the maximum value is received from the MN, the exemplary method can also include the operations of blocks 1260-1280. In block 1260, the SN can send, to the MN, one or more of the following:
- the UE's minimum required processing time, T_SCG, of SN messages scheduling UL SCG transmissions according to an SCG configuration selected by the SN (e.g., in sub-block 1231); and
- a request for updated restriction parameters.

In block 1270, the SN can receive, from the MN, the updated restriction parameters including an updated maximum value. In block 1280, the SN can select a different SCG configuration that corresponds to an updated T_SCG that is less than or equal to the updated maximum value.

In some embodiments, the one or more restriction parameters include a maximum allowed value, maxToffset, between the following: a last symbol of a scheduling message for a UE UL MCG transmission that overlaps with a UE UL SCG transmission, and a first symbol of the UE UL SCG transmission. In some variants, maxToffset is determined by max(T_MCG, maxT_SCG), where:
- T_MCG is the UE's minimum required processing time of MN scheduling messages for UE UL MCG transmissions based on an MCG configuration for the UE; and
- maxT_SCG is a maximum allowed value of the UE's minimum required processing time, T_SCG, of SN scheduling messages UE UL SCG transmissions based on an SCG configuration for the UE.

In some embodiments, the exemplary method can also include the operations of block 1210, where the SN can send, to the MN, a request for restriction parameters for SN selection of an SCG configuration for the UE. The restriction parameters can be received from the MN (e.g., in block 1220) in response to the request.

Figure 13:
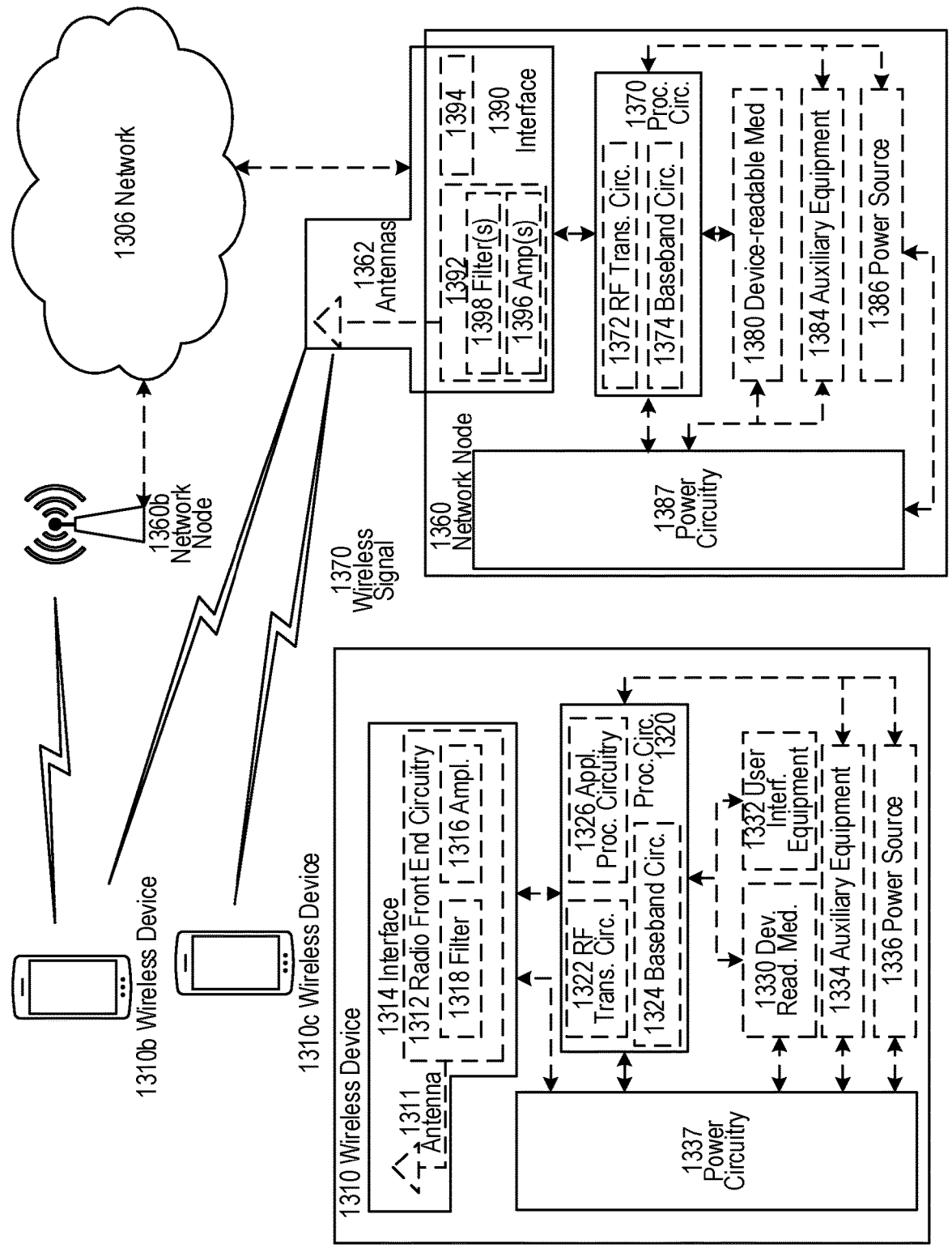
FIG. 13 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360*b*, and WDs 1310, 1310*b*, and 1310*c*. In practice, a wireless network can further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1360 are depicted as single boxes located within a larger box, or nested within multiple boxes, in practice, a network node can comprise multiple different physical components that make up a single illustrated component (e.g., device readable medium 1380 can comprise multiple separate hard drives as well as multiple RAM modules).

Similarly, network node 1360 can be composed of multiple physically separate components (e.g., a NodeB component and an RNC component, or a BTS component and a BSC component, etc.), which can each have their own respective components. In certain scenarios in which network node 1360 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1360 can be configured to support multiple radio access technologies (RATs). In such embodiments, some components can be duplicated (e.g., separate device readable medium 1380 for the different RATs) and some components can be reused (e.g., the same antenna 1362 can be shared by the RATs). Network node 1360 can also include multiple sets of the various illustrated components for different wireless technologies integrated into network node 1360, such as, for example, GSM, WCDMA, LTE, NR, WiFi, or Bluetooth wireless technologies. These wireless technologies can be integrated into the same or different chip or set of chips and other components within network node 1360.

Processing circuitry 1370 can be configured to perform any determining, calculating, or similar operations (e.g., certain obtaining operations) described herein as being provided by a network node. These operations performed by processing circuitry 1370 can include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1360, either alone or in conjunction with other network node 1360 components (e.g., device readable medium 1380). Such functionality can include any of the various wireless features, functions, or benefits discussed herein.

For example, processing circuitry 1370 can execute instructions stored in device readable medium 1380 or in memory within processing circuitry 1370. In some embodiments, processing circuitry 1370 can include a system on a chip (SOC). As a more specific example, instructions (also referred to as a computer program product) stored in medium 1380 can include instructions that, when executed by processing circuitry 1370, can configure network node 1360 to perform operations corresponding to various exemplary methods (e.g., procedures) described herein.

In some embodiments, processing circuitry 1370 can include one or more of radio frequency (RF) transceiver circuitry 1372 and baseband processing circuitry 1374. In some embodiments, radio frequency (RF) transceiver circuitry 1372 and baseband processing circuitry 1374 can be on separate chips (or sets of chips), boards, or units, such as radio units and digital units. In alternative embodiments, part or all of RF transceiver circuitry 1372 and baseband processing circuitry 1374 can be on the same chip or set of chips, boards, or units.

In certain embodiments, some or all of the functionality described herein as being provided by a network node, base station, eNB or other such network device can be performed by processing circuitry 1370 executing instructions stored on device readable medium 1380 or memory within processing circuitry 1370. In alternative embodiments, some or all of the functionality can be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360 but are enjoyed by network node 1360 as a whole, and/or by end users and the wireless network generally.

Device readable medium 1380 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1370. Device readable medium 1380 can store any suitable instructions, data or information, including a computer program, software, an application including one or more of logic, rules, code, tables, etc. and/or other instructions capable of being executed by processing circuitry 1370 and, utilized by network node 1360. Device readable medium 1380 can be used to store any calculations made by processing circuitry 1370 and/or any data received via interface 1390. In some embodiments, processing circuitry 1370 and device readable medium 1380 can be considered to be integrated.

Interface 1390 is used in the wired or wireless communication of signaling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that can be coupled to, or in certain embodiments a part of, antenna 1362. Radio front end circuitry 1392 comprises filters 1398 and amplifiers 1396. Radio front end circuitry 1392 can be connected to antenna 1362 and processing circuitry 1370. Radio front end circuitry can be configured to condition signals communicated between antenna 1362 and processing circuitry 1370. Radio front end circuitry 1392 can receive digital data that is to be sent out to other network nodes or WDs via a wireless connection. Radio front end circuitry 1392 can convert the digital data into a radio signal having the appropriate channel and bandwidth parameters using a combination of filters 1398 and/or amplifiers 1396. The radio signal can then be transmitted via antenna 1362. Similarly, when receiving data, antenna 1362 can collect radio signals which are then converted into digital data by radio front end circuitry 1392. The digital data can be passed to processing circuitry 1370. In other embodiments, the interface can comprise different components and/or different combinations of components.

In certain alternative embodiments, network node 1360 may not include separate radio front end circuitry 1392, instead, processing circuitry 1370 can comprise radio front end circuitry and can be connected to antenna 1362 without separate radio front end circuitry 1392. Similarly, in some embodiments, all or some of RF transceiver circuitry 1372 can be considered a part of interface 1390. In still other embodiments, interface 1390 can include one or more ports or terminals 1394, radio front end circuitry 1392, and RF transceiver circuitry 1372, as part of a radio unit (not shown), and interface 1390 can communicate with baseband processing circuitry 1374, which is part of a digital unit (not shown).

Antenna 1362 can include one or more antennas, or antenna arrays, configured to send and/or receive wireless signals. Antenna 1362 can be coupled to radio front end circuitry 1390 and can be any type of antenna capable of transmitting and receiving data and/or signals wirelessly. In some embodiments, antenna 1362 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1362 can be separate from network node 1360 and can be connectable to network node 1360 through an interface or port.

Antenna 1362, interface 1390, and/or processing circuitry 1370 can be configured to perform any receiving operations and/or certain obtaining operations described herein as being performed by a network node. Any information, data and/or signals can be received from a wireless device, another network node and/or any other network equipment. Similarly, antenna 1362, interface 1390, and/or processing circuitry 1370 can be configured to perform any transmitting operations described herein as being performed by a network node. Any information, data and/or signals can be transmitted to a wireless device, another network node and/or any other network equipment.

Power circuitry 1387 can comprise, or be coupled to, power management circuitry and can be configured to supply the components of network node 1360 with power for performing the functionality described herein. Power circuitry 1387 can receive power from power source 1386. Power source 1386 and/or power circuitry 1387 can be configured to provide power to the various components of network node 1360 in a form suitable for the respective components (e.g., at a voltage and current level needed for each respective component). Power source 1386 can either be included in, or external to, power circuitry 1387 and/or network node 1360. For example, network node 1360 can be connectable to an external power source (e.g., an electricity outlet) via an input circuitry or interface such as an electrical cable, whereby the external power source supplies power to power circuitry 1387. As a further example, power source 1386 can comprise a source of power in the form of a battery or battery pack which is connected to, or integrated in, power circuitry 1387. The battery can provide backup power should the external power source fail. Other types of power sources, such as photovoltaic devices, can also be used.

Alternative embodiments of network node 1360 can include additional components beyond those shown in FIG. 13 that can be responsible for providing certain aspects of the network node's functionality, including any of the functionality described herein and/or any functionality necessary to support the subject matter described herein. For example, network node 1360 can include user interface equipment to allow and/or facilitate input of information into network node 1360 and to allow and/or facilitate output of information from network node 1360. This can allow and/or facilitate a user to perform diagnostic, maintenance, repair, and other administrative functions for network node 1360.

In some embodiments, a wireless device (WD, e.g., WD 1310) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 can include multiple sets of one or more of the illustrated components for different wireless technologies supported by WD 1310, such as, for example, GSM, WCDMA, LTE, NR, WiFi, WiMAX, or Bluetooth wireless technologies, just to mention a few. These wireless technologies can be integrated into the same or different chips or set of chips as other components within WD 1310.

Antenna 1311 can include one or more antennas or antenna arrays, configured to send and/or receive wireless signals, and is connected to interface 1314. In certain alternative embodiments, antenna 1311 can be separate from WD 1310 and be connectable to WD 1310 through an interface or port. Antenna 1311, interface 1314, and/or processing circuitry 1320 can be configured to perform any receiving or transmitting operations described herein as being performed by a WD. Any information, data and/or signals can be received from a network node and/or another WD. In some embodiments, radio front end circuitry and/or antenna 1311 can be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320 and can be configured to condition signals communicated between antenna 1311 and processing circuitry 1320. Radio front end circuitry 1312 can be coupled to or a part of antenna 1311. In some embodiments, WD 1310 may not include separate radio front end circuitry 1312; rather, processing circuitry 1320 can comprise radio front end circuitry and can be connected to antenna 1311. Similarly, in some embodiments, some or all of RF transceiver circuitry 1322 can be considered a part of interface 1314. Radio front end circuitry 1312 can receive digital data that is to be sent out to other network nodes or WDs via a wireless connection. Radio front end circuitry 1312 can convert the digital data into a radio signal having the appropriate channel and bandwidth parameters using a combination of filters 1318 and/or amplifiers 1316. The radio signal can then be transmitted via antenna 1311. Similarly, when receiving data, antenna 1311 can collect radio signals which are then converted into digital data by radio front end circuitry 1312. The digital data can be passed to processing circuitry 1320. In other embodiments, the interface can comprise different components and/or different combinations of components.

Processing circuitry 1320 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1310 functionality either alone or in combination with other WD 1310 components, such as device readable medium 1330. Such functionality can include any of the various wireless features or benefits discussed herein.

For example, processing circuitry 1320 can execute instructions stored in device readable medium 1330 or in memory within processing circuitry 1320 to provide the functionality disclosed herein. More specifically, instructions (also referred to as a computer program product) stored in medium 1330 can include instructions that, when executed by processor 1320, can configure wireless device 1310 to perform operations corresponding to various exemplary methods (e.g., procedures) described herein.

As illustrated, processing circuitry 1320 includes one or more of RF transceiver circuitry 1322, baseband processing circuitry 1324, and application processing circuitry 1326. In other embodiments, the processing circuitry can comprise different components and/or different combinations of components. In certain embodiments processing circuitry 1320 of WD 1310 can comprise a SOC. In some embodiments, RF transceiver circuitry 1322, baseband processing circuitry 1324, and application processing circuitry 1326 can be on separate chips or sets of chips. In alternative embodiments, part or all of baseband processing circuitry 1324 and application processing circuitry 1326 can be combined into one chip or set of chips, and RF transceiver circuitry 1322 can be on a separate chip or set of chips. In still alternative embodiments, part or all of RF transceiver circuitry 1322 and baseband processing circuitry 1324 can be on the same chip or set of chips, and application processing circuitry 1326 can be on a separate chip or set of chips. In yet other alternative embodiments, part or all of RF transceiver circuitry 1322, baseband processing circuitry 1324, and application processing circuitry 1326 can be combined in the same chip or set of chips. In some embodiments, RF transceiver circuitry 1322 can be a part of interface 1314. RF transceiver circuitry 1322 can condition RF signals for processing circuitry 1320.

In certain embodiments, some or all of the functionality described herein as being performed by a WD can be provided by processing circuitry 1320 executing instructions stored on device readable medium 1330, which in certain embodiments can be a computer-readable storage medium. In alternative embodiments, some or all of the functionality can be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 can be configured to perform any determining, calculating, or similar operations (e.g., certain obtaining operations) described herein as being performed by a WD. These operations, as performed by processing circuitry 1320, can include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 can be operable to store a computer program, software, an application including one or more of logic, rules, code, tables, etc. and/or other instructions capable of being executed by processing circuitry 1320. Device readable medium 1330 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1320. In some embodiments, processing circuitry 1320 and device readable medium 1330 can be considered to be integrated.

User interface equipment 1332 can include components that allow and/or facilitate a human user to interact with WD 1310. Such interaction can be of many forms, such as visual, audial, tactile, etc. User interface equipment 1332 can be operable to produce output to the user and to allow and/or facilitate the user to provide input to WD 1310. The type of interaction can vary depending on the type of user interface equipment 1332 installed in WD 1310. For example, if WD 1310 is a smart phone, the interaction can be via a touch screen; if WD 1310 is a smart meter, the interaction can be through a screen that provides usage (e.g., the number of gallons used) or a speaker that provides an audible alert (e.g., if smoke is detected). User interface equipment 1332 can include input interfaces, devices and circuits, and output interfaces, devices and circuits. User interface equipment 1332 can be configured to allow and/or facilitate input of information into WD 1310 and is connected to processing circuitry 1320 to allow and/or facilitate processing circuitry 1320 to process the input information. User interface equipment 1332 can include, for example, a microphone, a proximity or other sensor, keys/buttons, a touch display, one or more cameras, a USB port, or other input circuitry. User interface equipment 1332 is also configured to allow and/or facilitate output of information from WD 1310, and to allow and/or facilitate processing circuitry 1320 to output information from WD 1310. User interface equipment 1332 can include, for example, a speaker, a display, vibrating circuitry, a USB port, a headphone interface, or other output circuitry. Using one or more input and output interfaces, devices, and circuits, of user interface equipment 1332, WD 1310 can communicate with end users and/or the wireless network and allow and/or facilitate them to benefit from the functionality described herein.

Auxiliary equipment 1334 is operable to provide more specific functionality which may not be generally performed by WDs. This can comprise specialized sensors for doing measurements for various purposes, interfaces for additional types of communication such as wired communications etc. The inclusion and type of components of auxiliary equipment 1334 can vary depending on the embodiment and/or scenario.

Power source 1336 can, in some embodiments, be in the form of a battery or battery pack. Other types of power sources, such as an external power source (e.g., an electricity outlet), photovoltaic devices or power cells, can also be used. WD 1310 can further comprise power circuitry 1337 for delivering power from power source 1336 to the various parts of WD 1310 which need power from power source 1336 to carry out any functionality described or indicated herein. Power circuitry 1337 can in certain embodiments comprise power management circuitry. Power circuitry 1337 can additionally or alternatively be operable to receive power from an external power source; in which case WD 1310 can be connectable to the external power source (such as an electricity outlet) via input circuitry or an interface such as an electrical power cable. Power circuitry 1337 can also in certain embodiments be operable to deliver power from an external power source to power source 1336. This can be, for example, for the charging of power source 1336. Power circuitry 1337 can perform any converting or other modification to the power from power source 1336 to make it suitable for supply to the respective components of WD 1310.

Figure 14:
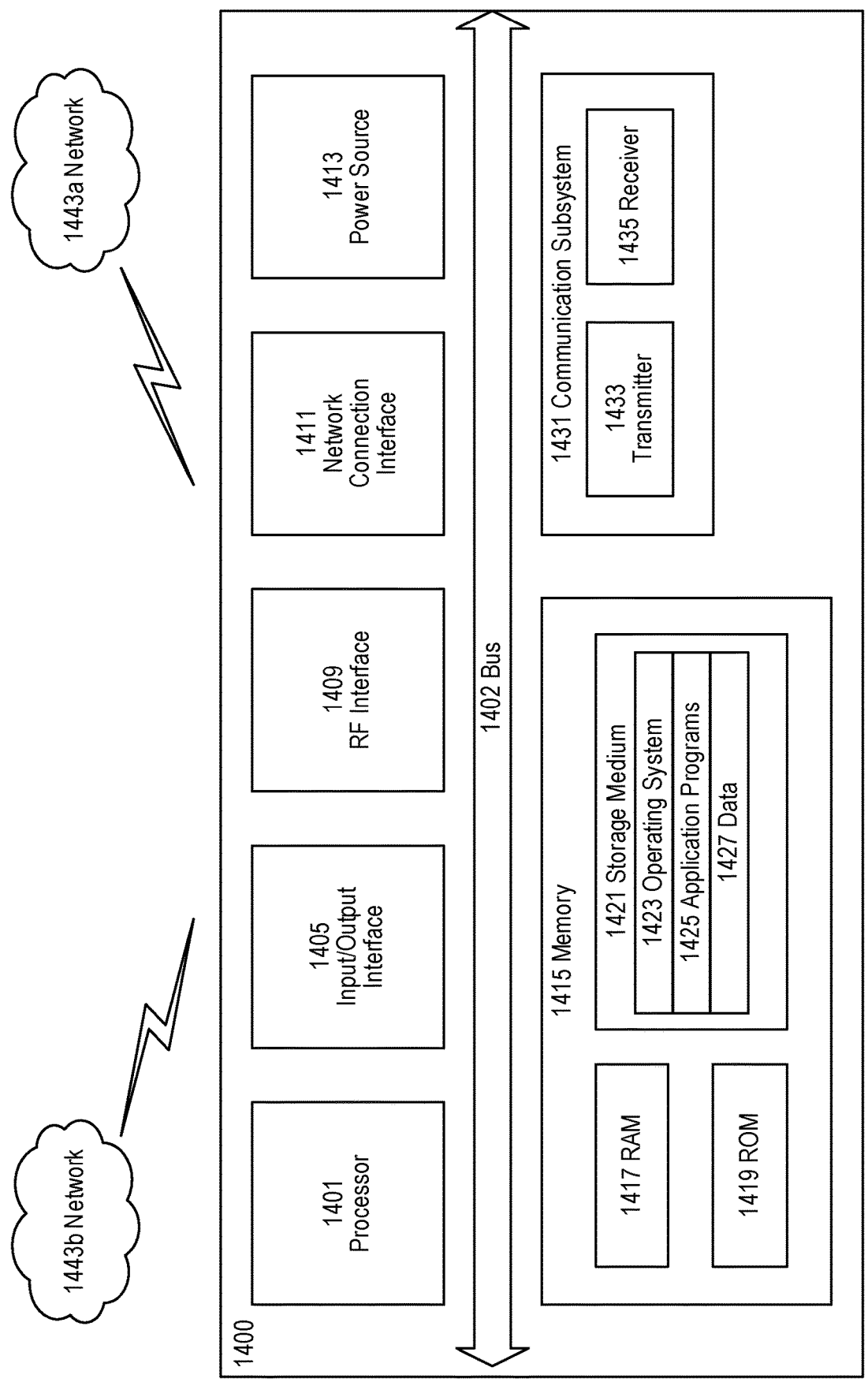
FIG. 14 illustrates an exemplary embodiment of a UE, in accordance with various aspects described herein.

FIG. 14 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1400 can be any UE identified by the $3^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 can include other similar types of information. Certain UEs can utilize all of the components shown in FIG. 14, or only a subset of the components. The level of integration between the components can vary from one UE to another UE. Further, certain UEs can contain multiple instances of a component, such as multiple processors, memories, transceivers, transmitters, receivers, etc.

In FIG. 14, processing circuitry 1401 can be configured to process computer instructions and data. Processing circuitry 1401 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 can include two central processing units (CPUs). Data can be information in a form suitable for use by a computer.

In the depicted embodiment, input/output interface 1405 can be configured to provide a communication interface to an input device, output device, or input and output device. UE 1400 can be configured to use an output device via input/output interface 1405. An output device can use the same type of interface port as an input device. For example, a USB port can be used to provide input to and output from UE 1400. The output device can be a speaker, a sound card, a video card, a display, a monitor, a printer, an actuator, an emitter, a smartcard, another output device, or any combination thereof. UE 1400 can be configured to use an input device via input/output interface 1405 to allow and/or facilitate a user to capture information into UE 1400. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 14, RF interface 1409 can be configured to provide a communication interface to RF components such as a transmitter, a receiver, and an antenna. Network connection interface 1411 can be configured to provide a communication interface to network 1443*a*. Network 1443*a* can encompass wired and/or wireless networks such as a local-area network (LAN), a wide-area network (WAN), a computer network, a wireless network, a telecommunications network, another like network or any combination thereof. For example, network 1443*a* can comprise a Wi-Fi network. Network connection interface 1411 can be configured to include a receiver and a transmitter interface used to communicate with one or more other devices over a communication network according to one or more communication protocols, such as Ethernet, TCP/IP, SONET, ATM, or the like. Network connection interface 1411 can implement receiver and transmitter functionality appropriate to the communication network links (e.g., optical, electrical, and the like). The transmitter and receiver functions can share circuit components, software or firmware, or alternatively can be implemented separately.

RAM 1417 can be configured to interface via bus 1402 to processing circuitry 1401 to provide storage or caching of data or computer instructions during the execution of software programs such as the operating system, application programs, and device drivers. ROM 1419 can be configured to provide computer instructions or data to processing circuitry 1401. For example, ROM 1419 can be configured to store invariant low-level system code or data for basic system functions such as basic input and output (I/O), startup, or reception of keystrokes from a keyboard that are stored in a non-volatile memory. Storage medium 1421 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1421 can be configured to include operating system 1423; application program 1425 such as a web browser application, a widget or gadget engine or another application; and data file 1427. Storage medium 1421 can store, for use by UE 1400, any of a variety of various operating systems or combinations of operating systems. For example, application program 1425 can include executable program instructions (also referred to as a computer program product) that, when executed by processor 1401, can configure UE 1400 to perform operations corresponding to various exemplary methods (e.g., procedures) described herein.

Storage medium 1421 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 can allow and/or facilitate UE 1400 to access computer-executable instructions, application programs or the like, stored on transitory or non-transitory memory media, to off-load data, or to upload data. An article of manufacture, such as one utilizing a communication system can be tangibly embodied in storage medium 1421, which can comprise a device readable medium.

In FIG. 14, processing circuitry 1401 can be configured to communicate with network 1443*b* using communication subsystem 1431. Network 1443*a* and network 1443*b* can be the same network or networks or different network or networks. Communication subsystem 1431 can be configured to include one or more transceivers used to communicate with network 1443*b*. For example, communication subsystem 1431 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1433 and/or receiver 1435 to implement transmitter or receiver functionality, respectively, appropriate to the RAN links (e.g., frequency allocations and the like). Further, transmitter 1433 and receiver 1435 of each transceiver can share circuit components, software or firmware, or alternatively can be implemented separately.

In the illustrated embodiment, the communication functions of communication subsystem 1431 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 can include cellular communication, Wi-Fi communication, Bluetooth communication, and GPS communication. Network 1443*b* can encompass wired and/or wireless networks such as a local-area network (LAN), a wide-area network (WAN), a computer network, a wireless network, a telecommunications network, another like network or any combination thereof. For example, network 1443*b* can be a cellular network, a Wi-Fi network, and/or a near-field network. Power source 1413 can be configured to provide alternating current (AC) or direct current (DC) power to components of UE 1400.

The features, benefits and/or functions described herein can be implemented in one of the components of UE 1400 or partitioned across multiple components of UE 1400. Further, the features, benefits, and/or functions described herein can be implemented in any combination of hardware, software or firmware. In one example, communication subsystem 1431 can be configured to include any of the components described herein. Further, processing circuitry 1401 can be configured to communicate with any of such components over bus 1402. In another example, any of such components can be represented by program instructions stored in memory that when executed by processing circuitry 1401 perform the corresponding functions described herein. In another example, the functionality of any of such components can be partitioned between processing circuitry 1401 and communication subsystem 1431. In another example, the non-computationally intensive functions of any of such components can be implemented in software or firmware and the computationally intensive functions can be implemented in hardware.

Figure 15:
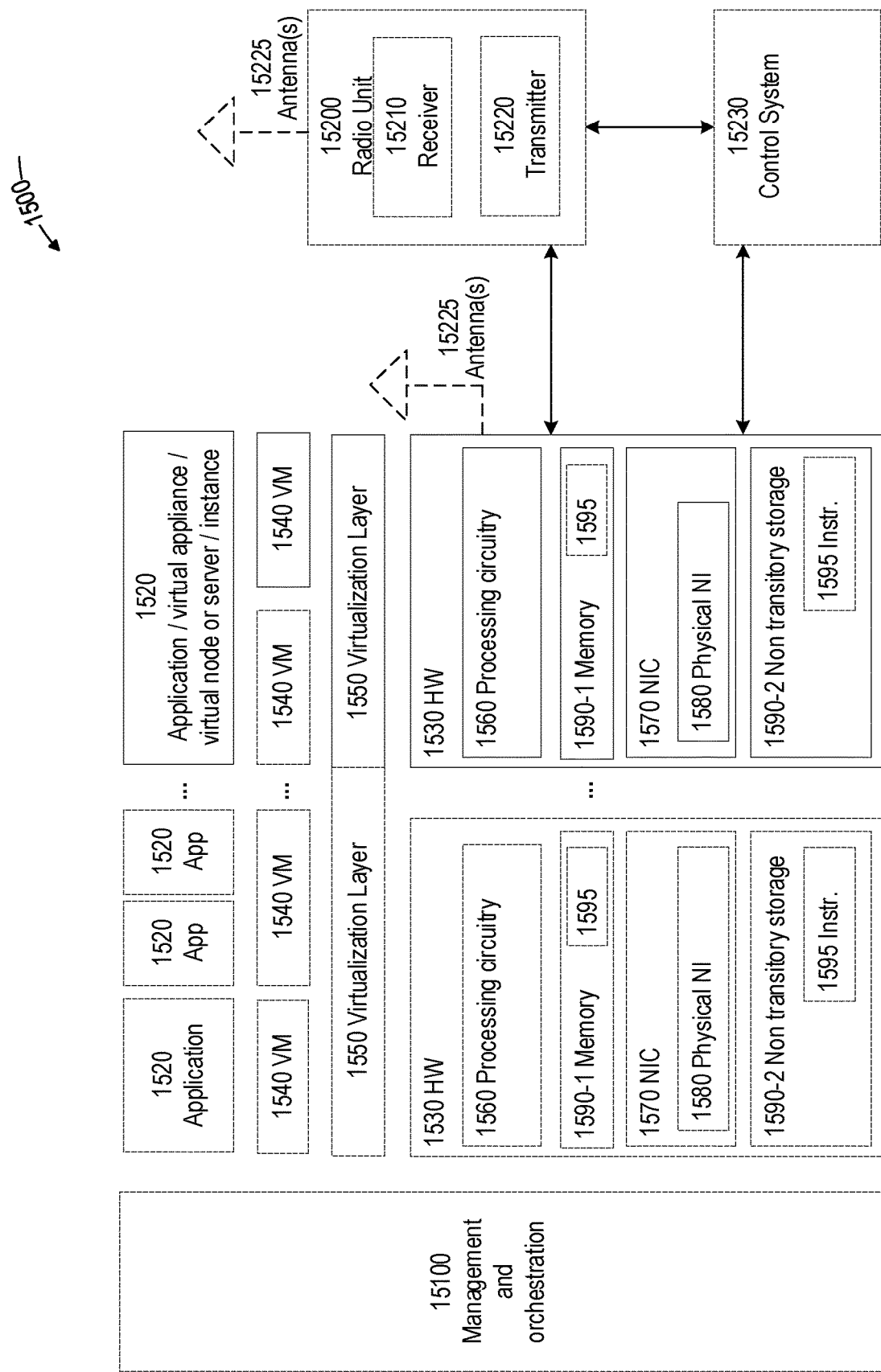
FIG. 15 is a block diagram illustrating an exemplary virtualization environment usable for implementation of various embodiments of network nodes described herein.

FIG. 15 is a schematic block diagram illustrating a virtualization environment 1500 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node can be entirely virtualized.

The functions can be implemented by one or more applications 1520 (which can alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500 can include general-purpose or special-purpose network hardware devices (or nodes) 1530 comprising a set of one or more processors or processing circuitry 1560, which can be commercial off-the-shelf (COTS) processors, dedicated Application Specific Integrated Circuits (ASICs), or any other type of processing circuitry including digital or analog hardware components or special purpose processors. Each hardware device can comprise memory 1590-1 which can be non-persistent memory for temporarily storing instructions 1595 or software executed by processing circuitry 1560. For example, instructions 1595 can include program instructions (also referred to as a computer program product) that, when executed by processing circuitry 1560, can configure hardware node 1520 to perform operations corresponding to various exemplary methods (e.g., procedures) described herein. Such operations can also be attributed to virtual node(s) 1520 that is/are hosted by hardware node 1530.

Each hardware device can comprise one or more network interface controllers (NICs) 1570, also known as network interface cards, which include physical network interface 1580. Each hardware device can also include non-transitory, persistent, machine-readable storage media 1590-2 having stored therein software 1595 and/or instructions executable by processing circuitry 1560. Software 1595 can include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and can be run by a corresponding virtualization layer 1550 or hypervisor. Different embodiments of the instance of virtual appliance 1520 can be implemented on one or more of virtual machines 1540, and the implementations can be made in different ways.

During operation, processing circuitry 1560 executes software 1595 to instantiate the hypervisor or virtualization layer 1550, which can sometimes be referred to as a virtual machine monitor (VMM). Virtualization layer 1550 can present a virtual operating platform that appears like networking hardware to virtual machine 1540.

As shown in FIG. 15, hardware 1530 can be a standalone network node with generic or specific components. Hardware 1530 can comprise antenna 15225 and can implement some functions via virtualization. Alternatively, hardware 1530 can be part of a larger cluster of hardware (e.g., such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1540 can be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 can be coupled to one or more antennas 15225. Radio units 15200 can communicate directly with hardware nodes 1530 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 15230, which can alternatively be used for communication between the hardware nodes 1530 and radio units 15200.

Figure 16:
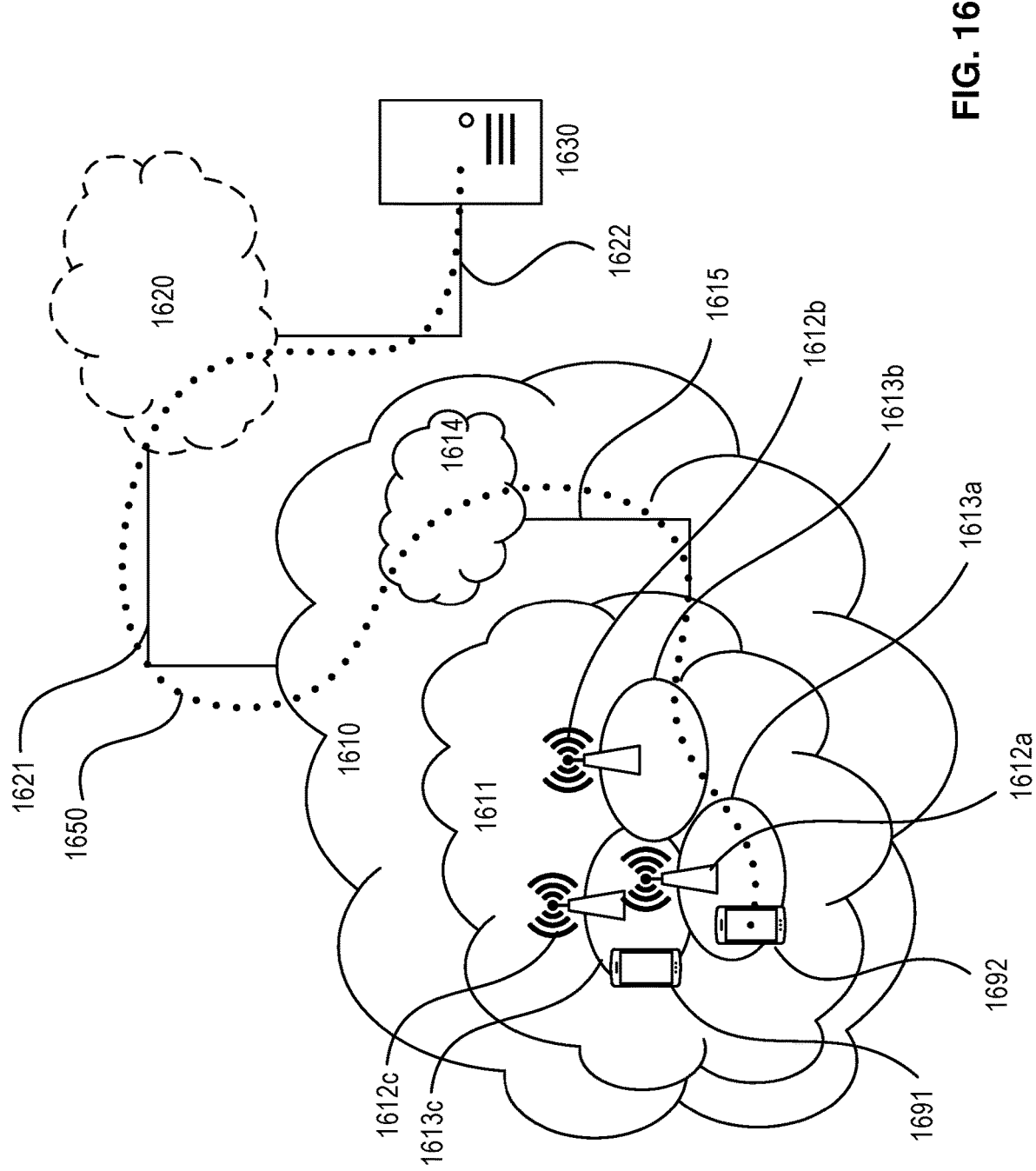
FIGS. 16-17 are block diagrams of various exemplary communication systems and/or networks, in accordance with various aspects described herein.

With reference to FIG. 16, in accordance with an embodiment, a communication system includes telecommunication network 1610, such as a 3GPP-type cellular network, which comprises access network 1611, such as a radio access network, and core network 1614. Access network 1611 comprises a plurality of base stations 1612a, 1612b, 1612c, such as NBs, eNBs, gNBs or other types of wireless access points, each defining a corresponding coverage area 1613a, 1613b, 1613c. Each base station 1612a, 1612b, 1612c is connectable to core network 1614 over a wired or wireless connection 1615. A first UE 1691 located in coverage area 1613c can be configured to wirelessly connect to, or be paged by, the corresponding base station 1612c. A second UE 1692 in coverage area 1613a is wirelessly connectable to the corresponding base station 1612a. While a plurality of UEs 1691, 1692 are illustrated in this example, the disclosed embodiments are equally applicable to a situation where a sole UE is in the coverage area or where a sole UE is connecting to any of base stations 1612a, 1612b, and 1612c.

Telecommunication network 1610 is itself connected to host computer 1630, which can be embodied in the hardware and/or software of a standalone server, a cloud-implemented server, a distributed server or as processing resources in a server farm. Host computer 1630 can be under the ownership or control of a service provider or can be operated by the service provider or on behalf of the service provider. Connections 1621 and 1622 between telecommunication network 1610 and host computer 1630 can extend directly from core network 1614 to host computer 1630 or can go via an optional intermediate network 1620. Intermediate network 1620 can be one of, or a combination of more than one of, a public, private or hosted network; intermediate network 1620, if any, can be a backbone network or the Internet; in particular, intermediate network 1620 can comprise two or more sub-networks (not shown).

The communication system of FIG. 16 as a whole enables connectivity between the connected UEs 1691, 1692 and host computer 1630. The connectivity can be described as an over-the-top (OTT) connection 1650. Host computer 1630 and the connected UEs 1691, 1692 are configured to communicate data and/or signaling via OTT connection 1650, using access network 1611, core network 1614, any intermediate network 1620 and possible further infrastructure (not shown) as intermediaries. OTT connection 1650 can be transparent in the sense that the participating communication devices through which OTT connection 1650 passes are unaware of routing of uplink and downlink communications. For example, base station 1612 may not or need not be informed about the past routing of an incoming downlink communication with data originating from host computer 1630 to be forwarded (e.g., handed over) to a connected UE 1691. Similarly, base station 1612 need not be aware of the future routing of an outgoing uplink communication originating from the UE 1691 towards the host computer 1630.

Example implementations, in accordance with an embodiment, of the UE, base station and host computer discussed in the preceding paragraphs will now be described with reference to FIG. 17. In communication system 1700, host computer 1710 comprises hardware 1715 including communication interface 1716 configured to set up and maintain a wired or wireless connection with an interface of a different communication device of communication system 1700. Host computer 1710 further comprises processing circuitry 1718, which can have storage and/or processing capabilities. In particular, processing circuitry 1718 can comprise one or more programmable processors, application-specific integrated circuits, field programmable gate arrays or combinations of these (not shown) adapted to execute instructions. Host computer 1710 further comprises software 1711, which is stored in or accessible by host computer 1710 and executable by processing circuitry 1718. Software 1711 includes host application 1712. Host application 1712 can be operable to provide a service to a remote user, such as UE 1730 connecting via OTT connection 1750 terminating at UE 1730 and host computer 1710. In providing the service to the remote user, host application 1712 can provide user data which is transmitted using OTT connection 1750.

Communication system 1700 can also include base station 1720 provided in a telecommunication system and comprising hardware 1725 enabling it to communicate with host computer 1710 and with UE 1730. Hardware 1725 can include communication interface 1726 for setting up and maintaining a wired or wireless connection with an interface of a different communication device of communication system 1700, as well as radio interface 1727 for setting up and maintaining at least wireless connection 1770 with UE 1730 located in a coverage area (not shown in FIG. 17) served by base station 1720. Communication interface 1726 can be configured to facilitate connection 1760 to host computer 1710. Connection 1760 can be direct, or it can pass through a core network (not shown in FIG. 17) of the telecommunication system and/or through one or more intermediate networks outside the telecommunication system. In the embodiment shown, hardware 1725 of base station 1720 can also include processing circuitry 1728, which can comprise one or more programmable processors, application-specific integrated circuits, field programmable gate arrays or combinations of these (not shown) adapted to execute instructions.

Base station 1720 also includes software 1721 stored internally or accessible via an external connection. For example, software 1721 can include program instructions (also referred to as a computer program product) that, when executed by processing circuitry 1728, can configure base station 1720 to perform operations corresponding to various exemplary methods (e.g., procedures) described herein.

Communication system 1700 can also include UE 1730 already referred to, whose hardware 1735 can include radio interface 1737 configured to set up and maintain wireless connection 1770 with a base station serving a coverage area in which UE 1730 is currently located. Hardware 1735 of UE 1730 can also include processing circuitry 1738, which can comprise one or more programmable processors, application-specific integrated circuits, field programmable gate arrays or combinations of these (not shown) adapted to execute instructions.

UE 1730 also includes software 1731, which is stored in or accessible by UE 1730 and executable by processing circuitry 1738. Software 1731 includes client application 1732. Client application 1732 can be operable to provide a service to a human or non-human user via UE 1730, with the support of host computer 1710. In host computer 1710, an executing host application 1712 can communicate with the executing client application 1732 via OTT connection 1750 terminating at UE 1730 and host computer 1710. In providing the service to the user, client application 1732 can receive request data from host application 1712 and provide user data in response to the request data. OTT connection 1750 can transfer both the request data and the user data.

Client application 1732 can interact with the user to generate the user data that it provides. Software 1731 can also include program instructions (also referred to as a computer program product) that, when executed by processing circuitry 1738, can configure UE 1730 to perform operations corresponding to various exemplary methods (e.g., procedures) described herein.

Figure 17:
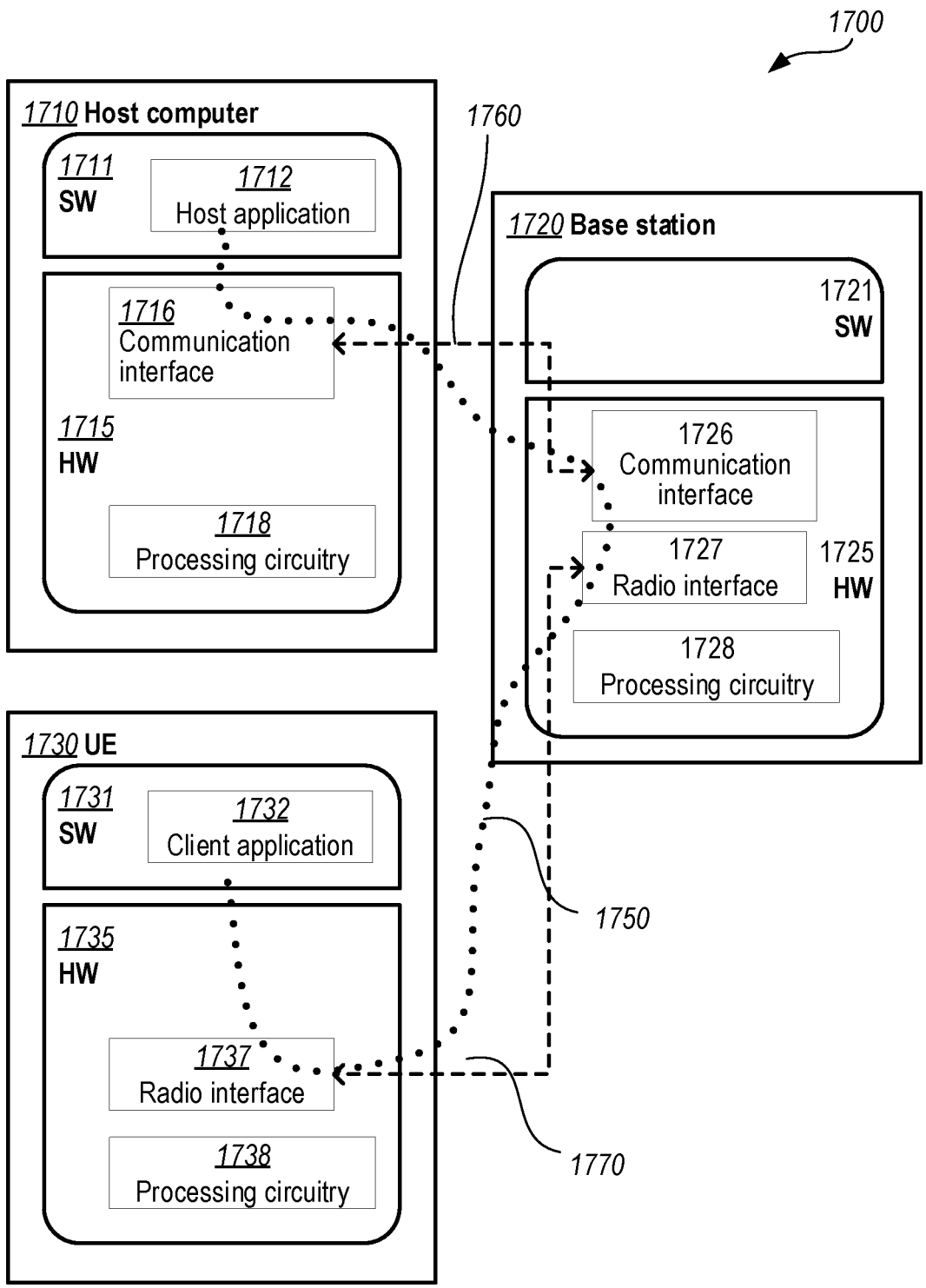

As an example, host computer 1710, base station 1720 and UE 1730 illustrated in FIG. 17 can be similar or identical to host computer 1630, one of base stations 1612a, 1612b, 1612c and one of UEs 1691, 1692 of FIG. 16, respectively. This is to say, the inner workings of these entities can be as shown in FIG. 17 and independently, the surrounding network topology can be that of FIG. 16.

In FIG. 17, OTT connection 1750 has been drawn abstractly to illustrate the communication between host computer 1710 and UE 1730 via base station 1720, without explicit reference to any intermediary devices and the precise routing of messages via these devices. Network infrastructure can determine the routing, which it can be configured to hide from UE 1730 or from the service provider operating host computer 1710, or both. While OTT connection 1750 is active, the network infrastructure can further take decisions by which it dynamically changes the routing (e.g., on the basis of load balancing consideration or reconfiguration of the network).

Wireless connection 1770 between UE 1730 and base station 1720 is in accordance with the teachings of the embodiments described throughout this disclosure. One or more of the various embodiments improve the performance of OTT services provided to UE 1730 using OTT connection 1750, in which wireless connection 1770 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1750 between host computer 1710 and UE 1730, in response to variations in the measurement results. The measurement procedure and/or the network functionality for reconfiguring OTT connection 1750 can be implemented in software 1711 and hardware 1715 of host computer 1710 or in software 1731 and hardware 1735 of UE 1730, or both. In embodiments, sensors (not shown) can be deployed in or in association with communication devices through which OTT connection 1750 passes; the sensors can participate in the measurement procedure by supplying values of the monitored quantities exemplified above, or supplying values of other physical quantities from which software 1711, 1731 can compute or estimate the monitored quantities. The reconfiguring of OTT connection 1750 can include message format, retransmission settings, preferred routing etc.; the reconfiguring need not affect base station 1720, and it can be unknown or imperceptible to base station 1720. Such procedures and functionalities can be known and practiced in the art. In certain embodiments, measurements can involve proprietary UE signaling facilitating host computer 1710's measurements of throughput, propagation times, latency and the like. The measurements can be implemented in that software 1711 and 1731 causes messages to be transmitted, in particular empty or 'dummy' messages, using OTT connection 1750 while it monitors propagation times, errors, etc.

FIG. 18 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 18 will be included in this section. In step 1810, the host computer provides user data. In substep 1811 (which can be optional) of step 1810, the host computer provides the user data by executing a host application. In step 1820, the host computer initiates a transmission carrying the user data to the UE. In step 1830 (which can be optional), the base station transmits to the UE the user data which was carried in the transmission that the host computer initiated, in accordance with the teachings of the embodiments described throughout this disclosure. In step 1840 (which can also be optional), the UE executes a client application associated with the host application executed by the host computer.

FIG. 19 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 19 will be included in this section. In step 1910 of the method, the host computer provides user data. In an optional substep (not shown) the host computer provides the user data by executing a host application. In step 1920, the host computer initiates a transmission carrying the user data to the UE. The transmission can pass via the base station, in accordance with the teachings of the embodiments described throughout this disclosure. In step 1930 (which can be optional), the UE receives the user data carried in the transmission.

FIG. 20 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 20 will be included in this section. In step 2010 (which can be optional), the UE receives input data provided by the host computer. Additionally or alternatively, in step 2020, the UE provides user data. In substep 2021 (which can be optional) of step 2020, the UE provides the user data by executing a client application. In substep 2011 (which can be optional) of step 2010, the UE executes a client application which provides the user data in reaction to the received input data provided by the host computer. In providing the user data, the executed client application can further consider user input received from the user. Regardless of the specific manner in which the user data was provided, the UE initiates, in sub step 2030 (which can be optional), transmission of the user data to the host computer. In step 2040 of the method, the host computer receives the user data transmitted from the UE, in accordance with the teachings of the embodiments described throughout this disclosure.

FIG. 21 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 21 will be included in this section. In step 2110 (which can be optional), in accordance with the teachings of the embodiments described throughout this disclosure, the base station receives user data from the UE. In step 2120 (which can be optional), the base station initiates transmission of the received user data to the host computer. In step 2130 (which can be optional), the host computer receives the user data carried in the transmission initiated by the base station.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

Example embodiments of the techniques and apparatus described herein include, but are not limited to, the following enumerated examples:

E1. A method for a user equipment (UE) configured for dual connectivity (DC) with a master node (MN) that is configured to provide a master cell group (MCG) and with a secondary node (SN) that is configured to provide a secondary cell group (SCG), the method comprising:
    sending, to the MN, an indication of a minimum offset UE capability, Toffset, between a first symbol of a UE uplink (UL) SCG transmission occasion and a last received symbol of an earlier scheduling message for a UE UL MCG transmission that overlaps with the UE UL SCG transmission occasion;
    receiving, from the MN, a scheduling message for an UL MCG transmission in accordance with the indication; and
    performing the UL MCG transmission and an UL SCG transmission that overlap at least partially in time.

E2. The method of embodiment E1, further comprising sending, to the SN, the indication of the minimum offset UE capability.

E3. The method of any of embodiments E1-E2, further comprising determining a total transmission power for the UL SCG transmission, during the overlap with the UL MCG transmission, based on a total transmission power for the UL MCG transmission.

E4. The method of any of embodiments E1-E3, wherein the UL SCG transmission is performed over multiple slots.

E5. The method of embodiment E4, wherein the minimum offset UE capability, Toffset, is between a first symbol of a particular slot of a UE uplink (UL) SCG transmission occasion and a last received symbol of an earlier scheduling message for a UE UL MCG transmission that overlaps with the particular slot of the UE UL SCG transmission occasion E6. The method of embodiment E4, wherein:
  the minimum offset UE capability, Toffset, is between a first symbol of a portion of a UE uplink (UL) SCG transmission occasion and a last received symbol of an earlier scheduling message for a UE UL MCG transmission that overlaps with the portion of the UE UL SCG transmission occasion; and
  the portion is one of the following: a fixed time duration or a number of OFDM symbols.

E7. The method of any of embodiments E4-E6, wherein the UE maintain the same total transmission power for the UL SCG transmission in all of the multiple slots.

E8. The method of any of embodiments E1-E7, further comprising receiving, from the MN, a request for the minimum offset UE capability, wherein the indication of the minimum offset UE capability is sent to the MN in response to the request.

E9. The method of any of embodiments E1-E7, further comprising:
  receiving at least one of a configuration for the MCG and a configuration for the MCG; and
  determining a change in the minimum offset UE capability based on the received at least one configuration,
  wherein the indication of the minimum offset UE capability is sent to the MN in response to determining the change.

E10. The method of any of embodiments E1-E7, wherein the method further comprises:
  receiving, from the MN, a minimum scheduling offset, minToffset, used by the MN when scheduling UE UL MCG transmissions, between a first symbol of a UE UL SCG transmission occasion and a last received symbol of an earlier scheduling message for a UE UL MCG transmission that overlaps with the UE UL SCG transmission; and
  processing the scheduling message in accordance with the minimum scheduling offset.

E11. A method performed by a master node (MN) configured to provide a master cell group (MCG) in dual connectivity (DC) with a user equipment (UE) together with a secondary node (SN) configured to provide a secondary cell group (SCG), the method comprising:
  determining one or more parameters related to a minimum offset UE capability, Toffset, between a first symbol of a UE uplink (UL) SCG transmission occasion and a last received symbol of an earlier scheduling message for a UE UL MCG transmission that overlaps with the UE UL SCG transmission occasion;
  sending, to the SN, the parameters related to the minimum UE offset capability; and
  sending, to the UE, a scheduling message for an UL MCG transmission in accordance with the parameters related to the minimum offset UE capability.

E12. The method of embodiment E11, wherein the one or more parameters include a minimum scheduling offset, minToffset, used by the MN when scheduling UE UL MCG transmissions, between a first symbol of a UE UL SCG transmission occasion and a last received symbol of an earlier scheduling message for a UE UL MCG transmission that overlaps with the UE UL SCG transmission.

E13. The method of embodiment E12, wherein the one or more parameters also include an estimated first maximum UE processing time, T_MCG, that is based on UE capabilities and a configuration of the MCG.

E14. The method of any of embodiments E11-E12, wherein:
  the method further comprises receiving, from the SN, an estimated second maximum UE processing time, T_SCG, that is based on UE capabilities and a configuration of the SCG; and
  the minimum scheduling offset, minToffset, is determined based on the estimated second maximum UE processing time, T_SCG.

E15. The method of embodiment E11, wherein the one or more parameters include an allowed second maximum UE processing time, maxT_SCG, to be used by the SN when determining an SCG configuration for the UE.

E16. The method of any of embodiments E11-E15, further comprising receiving, from the UE, an indication of the minimum offset UE capability, wherein the one or more parameters are determined based on the received minimum offset UE capability.

E17. The method of embodiment E16, further comprising sending, to the UE, a request for the minimum offset UE capability, wherein the indication of the minimum offset UE capability is received in response to the request.

E18. The method of embodiment E16, further comprising sending, to the UE, a configuration for the MCG, wherein the indication of the minimum offset UE capability is received in response to the MCG configuration.

E19. The method of any of embodiments E11-E18, further comprising one of the following:
  receiving, from the SN, an indication of a maximum possible SCG transmission length, max-SCGtxlength; and
  sending, to the SN, an indication of a maximum allowed SCG transmission length, max-allowedSCGtxlength,
  wherein the scheduling message for the UL MCG transmission is also accordance with the maximum possible SCG transmission length or the maximum allowed SCG transmission length.

E20. The method of any of embodiments E11-E19, wherein:
  the UL SCG transmission is performed over multiple slots; and
  the minimum offset UE capability, Toffset, is between a first symbol of a particular slot of a UE uplink (UL) SCG transmission occasion and a last received symbol of an earlier scheduling message for a UE UL MCG transmission that overlaps with the particular slot of the UE UL SCG transmission occasion.

E21. A method performed by a secondary node (SN) configured to provide a secondary cell group (SCG) in dual connectivity (DC) with a user equipment (UE) together with a master node (MN) configured to provide a master cell group (MCG), the method comprising:
  receiving, from the MN, one or more parameters related to a minimum offset UE capability, Toffset, between a first symbol of a UE uplink (UL) SCG transmission occasion and a last received symbol of an earlier scheduling message for a UE UL MCG transmission that overlaps with the UE UL SCG transmission occasion; and
  performing one or more of the following operations based on the one or more parameters:
    determining an SCG configuration for the UE, and
    scheduling an UL SCG transmission for the UE.

E22. The method of embodiment E21, wherein the one or more parameters include a minimum scheduling offset, minToffset, used by the MN when scheduling UE UL MCG transmissions, between a first symbol of a UE UL SCG transmission occasion and a last received symbol of an earlier scheduling message for a UE UL MCG transmission that overlaps with the UE UL SCG transmission.

E23. The method of embodiment E22, wherein the one or more parameters also include an estimated first maximum UE processing time, T_MCG, that is based on UE capabilities and a configuration of the MCG.

E24. The method of any of embodiments E21-E22, wherein:
the method further comprises sending, to the MN, an estimated second maximum UE processing time, T_SCG, that is based on UE capabilities and a configuration of the SCG; and
the received minimum scheduling offset, minToffset, is based on the estimated second maximum UE processing time.

E25. The method of embodiment E21, wherein the one or more parameters include an allowed second maximum UE processing time, maxT_SCG, to be used by the SN when determining the SCG configuration for the UE.

E26. The method of any of embodiments E21-E25, further comprising receiving, from the UE, an indication of the minimum offset UE capability, wherein the one or more operations are also perform based on the received minimum offset UE capability.

E27. The method of embodiment E26, further comprising sending, to the UE, a request for the minimum offset UE capability, wherein the indication of the minimum offset UE capability is received in response to the request.

E28. The method of embodiment E26, further comprising sending, to the UE, a configuration for the SCG, wherein the indication of the minimum offset UE capability is received in response to the SCG configuration.

E29. The method of any of embodiments E21-E28, further comprising one of the following:
sending, to the MN, an indication of a maximum possible SCG transmission length, max-SCGtxlength; and
receiving, from the SN, an indication of a maximum allowed SCG transmission length, max-allowedSCGtxlength,
wherein the one or more operations are also performed based on the maximum possible SCG transmission length or the maximum allowed SCG transmission length.

E30. The method of any of embodiments E21-E29, wherein:
the UL SCG transmission is performed over multiple slots; and
the minimum offset UE capability, Toffset, is between a first symbol of a particular slot of a UE uplink (UL) SCG transmission occasion and a last received symbol of an earlier scheduling message for a UE UL MCG transmission that overlaps with the particular slot of the UE UL SCG transmission occasion.

E31. A user equipment (UE) configured for dual connectivity (DC) with a master node (MN) that is configured to provide a master cell group (MCG) and with a secondary node (SN) that is configured to provide a secondary cell group (SCG), the UE comprising:
radio interface circuitry configured to communicate with the MN and the SN; and
processing circuitry operably coupled to the radio interface circuitry, whereby the processing circuitry and the radio interface circuitry are configured to perform operations corresponding to any of the methods of embodiments 1-10.

32. A user equipment (UE) configured for dual connectivity (DC) with a master node (MN) that is configured to provide a master cell group (MCG) and with a secondary node (SN) that is configured to provide a secondary cell group (SCG), the UE being further arranged to perform operations corresponding to any of the methods of embodiments 1-10.

33. A non-transitory, computer-readable medium storing program instructions that, when executed by processing circuitry of a user equipment (UE) configured for dual connectivity (DC) with a master node (MN) that is configured to provide a master cell group (MCG) and with a secondary node (SN) that is configured to provide a secondary cell group (SCG), configure the UE to perform operations corresponding to any of the methods of embodiments 1-10.

34. A computer program product comprising program instructions that, when executed by processing circuitry of a user equipment (UE) configured for dual connectivity (DC) with a master node (MN) that is configured to provide a master cell group (MCG) and with a secondary node (SN) that is configured to provide a secondary cell group (SCG), configure the UE to perform operations corresponding to any of the methods of embodiments 1-10.

35. A network node configured for dual-connectivity (DC) with a user equipment (UE) via a master cell group (MCG) or via a secondary cell group (SCG), the network node comprising:
communication interface circuitry configured to communicate with the UE and with another network nodes configured for DC with the UE; and
processing circuitry operably coupled with the communication interface circuitry, whereby the processing circuitry and the communication interface circuitry are configured to perform operations corresponding to any of the methods of embodiments 11-30.

36. A network node configured for dual-connectivity (DC) with a user equipment (UE) via a master cell group (MCG) or via a secondary cell group (SCG), the network node being further arranged to perform operations corresponding to any of the methods of embodiments 11-30.

37. A non-transitory, computer-readable medium storing program instructions that, when executed by processing circuitry of a network node configured for dual-connectivity (DC) with a user equipment (UE) via a master cell group (MCG) or via a secondary cell group (SCG), configure the network node to perform operations corresponding to any of the methods of embodiments 11-30.

38. A computer program product comprising program instructions that, when executed by processing circuitry of a network node configured for dual-connectivity (DC) with a user equipment (UE) via a master cell group (MCG) or via a secondary cell group (SCG), configure the network node to perform operations corresponding to any of the methods of embodiments 11-30.

The invention claimed is:

1. A method for a master node (MN) configured to provide a master cell group (MCG) for a user equipment (UE) in dual connectivity (DC) with a secondary node (SN) configured to provide a secondary cell group (SCG), the method comprising:
determining one or more restriction parameters for restricting SN selection of an SCG configuration for the UE, wherein the one or more restriction parameters include or indicate a maximum Time Offset value, maxToffset, such that a maximum of UE processing times that are specified for a selected SCG configuration does not exceed maxToffset; and
sending the one or more restriction parameters to the SN.

2. The method of claim 1, wherein the one or more restriction parameters include maxToffset.

3. The method of claim 1, wherein for UE uplink (UL) SCG transmissions that occur over a plurality of slots, maxToffset is applicable in each of the plurality of slots.

4. The method of claim 1, wherein maxToffset indicates a maximum allowed difference between the following:
- a last symbol of a scheduling message for a UE uplink (UL) MCG transmission that overlaps with a UE UL SCG transmission; and
- a first symbol of the UE UL SCG transmission.

5. The method of claim 4, wherein:
- maxToffset is determined by max (T_MCG, maxT_SCG);
- T_MCG is the UE's minimum required processing time of MN scheduling messages for UE UL MCG transmissions based on an MCG configuration for the UE; and
- maxT_SCG is a maximum allowed value of the UE's minimum required processing time, T_SCG, of SN scheduling messages UE UL SCG transmissions based on an SCG configuration for the UE.

6. The method of claim 1, wherein the one or more restriction parameters include an indication of the UE's capability of minimum offset between a first symbol of a UE UL SCG transmission and a last received symbol of an earlier scheduling message for a UE UL MCG transmission that overlaps with the UE UL SCG transmission occasion.

7. The method of claim 1, wherein:
- the method further comprises receiving, from the SN, a request for restriction parameters for SN selection of an SCG configuration for the UE; and
- the one or more restriction parameters are sent to the SN in response to the request.

8. A non-transitory, computer-readable medium storing program instructions that, when executed by processing circuitry of a network node configured to provide a master cell group (MCG) for a user equipment (UE) in dual connectivity (DC), configure the network node to perform operations corresponding to the method of claim 1.

9. A method for a secondary node (SN) configured to provide a secondary cell group (SCG) for a user equipment (UE) in dual connectivity (DC) with a master node (MN) configured to provide a master cell group (MCG), the method comprising:
- receiving, from the MN, one or more restriction parameters for restricting SN selection of an SCG configuration for the UE, wherein the one or more restriction parameters include or indicate a maximum Time Offset value, maxToffset, such that a maximum of UE processing times that are specified for a selected SCG configuration does not exceed maxToffset; and
- performing one or more of the following based on the one or more restriction parameters:
  - determining an SCG configuration for the UE, and
  - scheduling an uplink (UL) SCG transmission for the UE.

10. The method of claim 9, wherein the one or more restriction parameters include maxToffset.

11. The method of claim 9, wherein for UE UL SCG transmissions that occur over a plurality of slots, maxToffset is applicable in each of the plurality of slots.

12. The method of claim 9, wherein maxToffset indicates a maximum allowed difference between the following:
- a last symbol of a scheduling message for a UE UL MCG transmission that overlaps with a UE UL SCG transmission; and
- a first symbol of the UE UL SCG transmission.

13. The method of claim 12, wherein:
- maxToffset is equal to max (T_MCG, maxT_SCG);
- T_MCG is the UE's minimum required processing time of MN scheduling messages for UE UL MCG transmissions based on an MCG configuration for the UE; and
- maxT_SCG is a maximum allowed value of the UE's minimum required processing time, T_SCG, of SN scheduling messages UE UL SCG transmissions based on an SCG configuration for the UE.

14. The method of claim 9, wherein the one or more restriction parameters include an indication of the UE's capability of minimum offset between a first symbol of a UE UL SCG transmission and a last received symbol of an earlier scheduling message for a UE UL MCG transmission that overlaps with the UE UL SCG transmission occasion.

15. The method of claim 9, wherein:
- the method further comprises sending, to the MN, a request for restriction parameters for SN selection of an SCG configuration for the UE; and
- the one or more restriction parameters are received from the MN in response to the request.

16. A network node configured to provide a secondary cell group (SCG) for a user equipment (UE) in dual connectivity (DC) with a master node (MN) configured to provide a master cell group (MCG), the network node comprising:
- communication interface circuitry configured to communicate with the UE and with the MN; and
- processing circuitry operably coupled with the communication interface circuitry, whereby the processing circuitry and the communication interface circuitry are configured to perform operations corresponding to the method of claim 9.

17. A non-transitory, computer-readable medium storing program instructions that, when executed by processing circuitry of a network node configured to provide a secondary cell group (SCG) for a user equipment (UE) in dual connectivity (DC), configure the network node to perform operations corresponding to the method of claim 9.

18. A network node configured to provide a master cell group (MCG) for a user equipment (UE) in dual connectivity (DC) with a secondary node (SN) configured to provide a secondary cell group (SCG), the network node comprising:
- communication interface circuitry configured to communicate with the UE and with the SN; and
- processing circuitry operably coupled with the communication interface circuitry, whereby the processing circuitry and the communication interface circuitry are configured to:
  - determine one or more restriction parameters for restricting SN selection of an SCG configuration for the UE, wherein the one or more restriction parameters include or indicate a maximum Time Offset value, maxToffset, such that a maximum of UE processing times that are specified for a selected SCG configuration does not exceed maxToffset; and
  - send the one or more restriction parameters to the SN.

* * * * *